(12) United States Patent
Kwon et al.

(10) Patent No.: US 11,150,742 B2
(45) Date of Patent: *Oct. 19, 2021

(54) DEFORMABLE DISPLAY DEVICE AND OPERATING METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,081

(22) Filed: Oct. 17, 2019

(65) Prior Publication Data

US 2020/0050285 A1 Feb. 13, 2020

Related U.S. Application Data

(63) Continuation of application No. 15/739,579, filed as application No. PCT/KR2015/007869 on Oct. 2, 2015, now Pat. No. 10,488,947.

(30) Foreign Application Priority Data

Jun. 22, 2015 (KR) ........................ 10-2015-0088674

(51) Int. Cl.
*G06F 3/03* (2006.01)
*G09F 9/30* (2006.01)
(Continued)

(52) U.S. Cl.
CPC ................ *G06F 3/03* (2013.01); *G06F 1/163* (2013.01); *G06F 1/1643* (2013.01);
(Continued)

(58) Field of Classification Search
None
See application file for complete search history.

(56) References Cited

U.S. PATENT DOCUMENTS 9,589,529 B2 3/2017 Kim
2002/0149619 A1* 10/2002 Sauer ........................ G06F 8/38
715/762

(Continued)

FOREIGN PATENT DOCUMENTS

KR 10-2009-0019224 A 2/2009
KR 10-2014-0052323 A 5/2014
(Continued)

OTHER PUBLICATIONS

Nagaraju S., 'Novel User Interaction Styles with Flexible/Rollable Screens', CHItaly'13, ACM. (Year: 2013).*

(Continued)

*Primary Examiner* — Patrick F Valdez
(74) *Attorney, Agent, or Firm* — Birch, Stewart, Kolasch & Birch, LLP

(57) ABSTRACT

An operating method of a flexible display device including a display unit expandable or reducible in at least one direction; a sensing unit configured to detect an expansion or reduction of a screen of the display unit; and a control unit configured to: expand the screen of the display unit according to detecting the expansion of the screen, and display a content on the expanded screen, wherein the control unit is further configured to display a ratio indicator providing information on an enlargement ratio or a reduction ratio of the displayed content in the expansion screen, wherein the ratio indicator comprises: an enlargement/reduction guide bar representing what degree of a ratio the displayed content can be enlarged or reduced.

14 Claims, 43 Drawing Sheets

(51) Int. Cl.
*G06F 1/16* (2006.01)
*G09G 5/373* (2006.01)

(52) U.S. Cl.
CPC .............. *G06F 1/1652* (2013.01); *G09F 9/30* (2013.01); *G09F 9/301* (2013.01); *G09G 5/373* (2013.01); *G09G 2340/045* (2013.01); *G09G 2354/00* (2013.01); *G09G 2380/02* (2013.01)

(56) References Cited

U.S. PATENT DOCUMENTS

| | | | |
|---|---|---|---|
| 2004/0145595 A1* | 7/2004 | Bennett | H04N 7/0122 |
| | | | 345/660 |
| 2006/0125391 A1 | 6/2006 | Aksamit et al. | |
| 2008/0178116 A1* | 7/2008 | Kim | G06F 3/04847 |
| | | | 715/786 |
| 2009/0061948 A1 | 3/2009 | Lee et al. | |
| 2010/0033435 A1 | 2/2010 | Huitema | |
| 2010/0177020 A1 | 7/2010 | Bemelmans et al. | |
| 2012/0110501 A1 | 5/2012 | Baek et al. | |
| 2013/0203469 A1* | 8/2013 | Cho | G06F 3/04886 |
| | | | 455/566 |
| 2014/0201661 A1 | 7/2014 | Allen et al. | |
| 2014/0204037 A1* | 7/2014 | Kim | G06F 3/03 |
| | | | 345/173 |
| 2015/0185787 A1 | 7/2015 | Choi et al. | |
| 2016/0033999 A1 | 2/2016 | Browning | |
| 2016/0307545 A1* | 10/2016 | Lee | G09G 5/346 |
| 2016/0349971 A1* | 12/2016 | Chi | G09G 5/373 |
| 2017/0011714 A1 | 1/2017 | Eim et al. | |

FOREIGN PATENT DOCUMENTS

| | | |
|---|---|---|
| KR | 10-2014-0100149 A | 8/2014 |
| WO | WO 2013/154318 A1 | 10/2013 |

OTHER PUBLICATIONS

Khalilbeigi et al, "Xpaaand: Interaction Techniques for Rollable Displays", CHI 2011, pp. 2729-2732, 2011. (Year: 2011).

Nagaraju S. "Novel User Interaction Styles with Flexible/Rollable Screens", CHItaly'13, ACM, 2013. (Year: 2013).

\* cited by examiner 200-1

250_1

FIG. 3A
FIG. 3B
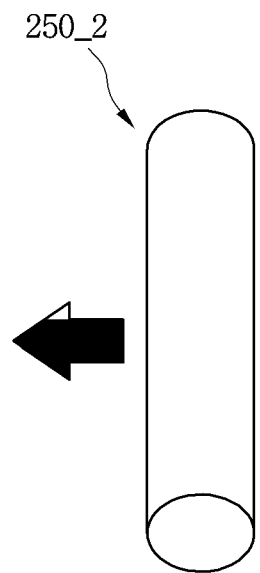
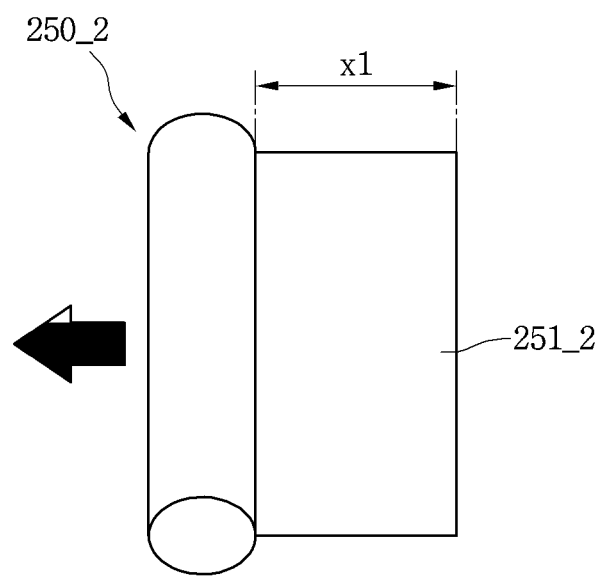

DEFORMABLE DISPLAY DEVICE AND OPERATING METHOD THEREOF

CROSS-REFERENCE TO RELATED APPLICATIONS

This application is a Continuation of co-pending U.S. patent application Ser. No. 15/739,579 filed on Dec. 22, 2017, which is the National Phase of PCT International Application No. PCT/KR2015/007869, filed on Oct. 2, 2015, which claims priority under 35 U.S.C. 119(a) to Patent Application No. 10-2015-0088674, filed in Republic of Korea on Jun. 22, 2015, all of which are hereby expressly incorporated by reference into the present application.

BACKGROUND OF THE INVENTION

Field of the Invention

The present invention relates to a deformable display device and an operating method thereof.

Discussion of the Related Art

With the recent development of display related technology, deformable display devices at the usage stage, for example, rolled in a roll form or flexible in at least one direction, are being studied and developed. Since these displays are deformable in various forms, they satisfy the demand on a large-sized display at the usage state and a small-sized display for carrying.

Moreover, deformable display devices may be deformed to a predetermined form and also may be deformed to various forms in correspondence to a user's request or the need of a situation where a display is used. Accordingly, when the display area of a display is fixed, there may be inconvenience in use.

SUMMARY OF THE INVENTION

Embodiments provide a deformable display device that is expanded or reduced according to a user's request.

Embodiments also provide a deformable display device for displaying enlarged or reduced content as the screen size of a display unit is expanded or is reduced.

In one embodiment, an operating method of a deformable display device including a display unit is provided. The method includes: expanding a screen of the display unit in a first direction according to a force expanding the display unit; displaying content in an expansion area that is an area that the screen of the display unit is expanded; expanding the screen of the display unit according to an additional force; and displaying an enlarge content on the expanded screen.

In another embodiment, a deformable display device includes: a display unit expanded or reduced in at least one direction; a sensing unit detecting a force applied to the display unit; and a control unit expanding a screen of the display unit in a first direction according to a force expanding the display unit, displaying content in an expansion area that is an area that the screen of the display unit is expanded, expanding the screen of the display unit according to an additional force; and displaying an enlarge content on the expanded screen.

The control unit may control the display unit to display a ratio indicator providing information on an enlargement ratio or a reduction ratio of the displayed content in the expansion area.

The ratio indicator includes: an enlargement/reduction guide bar representing what degree of a ratio the displayed content is able to be enlarged or reduced; a ratio box disposed on the enlargement/reduction guide bar and representing what ratio the displayed content is enlarged or reduced currently; and a plurality of ratio numerical values representing an enlargement or reduction ratio as a numerical value.

The control unit may control the display unit to display a guide for enlarging or reducing the screen of the display unit to display the content having a size of an optimal resolution corresponding to a display ratio of the content.

The control unit may control the display unit to display a guide for enlarging or reducing the screen of the display unit to display the content having a size of an optimal resolution corresponding to a resolution that the deformable display device supports.

The control unit may control the display unit to display to receive a request selecting one point of the displayed content and display an enlarged content on the basis of one point selected according to a received request.

The details of one or more embodiments are set forth in the accompanying drawings and the description below. Other features will be apparent from the description and drawings, and from the claims.

BRIEF DESCRIPTION OF THE DRAWINGS

FIGS. 3A and 3C are views illustrating a usage example of a rollable display device that is an example of a deformable display device.

DETAILED DESCRIPTION OF THE EMBODIMENTS

Figure 1A:
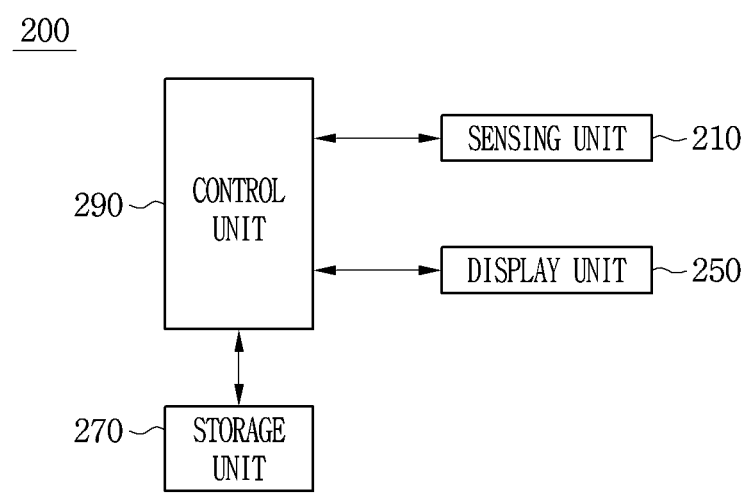
FIG. 1A is a view illustrating a configuration of a deformable display device according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and, do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Figure 1B:
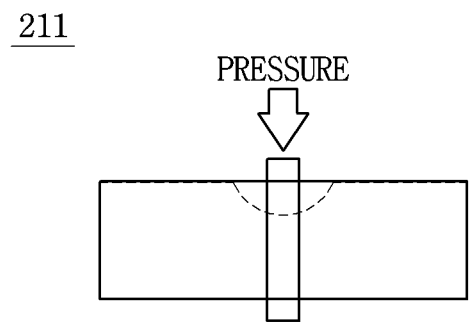
FIG. 1B is a view illustrating a pressure sensor configuring a sensing unit.
Figure 1C:
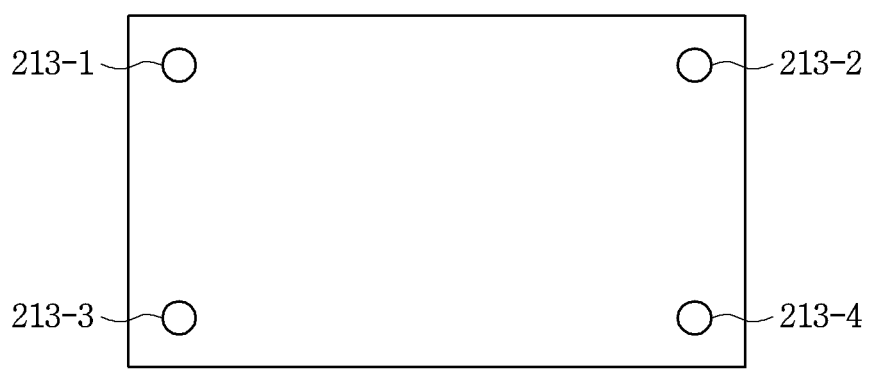
FIG. 1C is a view illustrating a configuration of a display unit where a sensing unit includes a plurality of acceleration sensors.

FIGS. 1A to 1C are views illustrating a configuration of a deformable display device according to an embodiment of the present invention.

Especially, FIG. 1A is a block diagram illustrating a configuration of a deformable display device 200 according to an embodiment of the present invention. FIG. 1B is a view illustrating a pressure sensor 211 configuring a sensing unit 210. FIG. 1C is a view illustrating a configuration of a display unit 250 where a plurality of acceleration sensors 231-1 to 213-4.

Unlike an existing display that is implemented only with rigid material such as glass or silicon, the deformable display device 200 according to an embodiment of the present invention is a next generation display device that is implemented in various and new environments due to its bending and stretchable characteristics.

According to an embodiment of the present invention, the deformable display device 200 may be a stretchable display device that is stretched when pulled and reduced to its original state again when released. The stretchable display device is stretched when pulled and fixed in a stretched state when a predetermined time elapses in the stretched state. Additionally, the stretchable display device may be reduced to its original state when reducing force is applied.

According to another embodiment of the present invention, the deformable display device 200 may be a rollable display device that is rolled in a roll form or changeable to be unrolled like paper.

Referring to FIG. 1A, the deformable display device 200 may include a sensing unit 210, a display unit 250, a storage unit 270, and a control unit 290.

The sensing unit 210 may detect the intensity of force and the direction of force, which are applied to the display unit 250.

According to an embodiment of the present invention, the sensing unit 210 may include at least one pressure sensor. At least one pressure sensor may be disposed at the display unit 250. When the sensing unit 210 includes at least one pressure sensor, each pressure sensor 211, as shown in FIG. 1B, may detect changes in capacitance or resistance between both ends of an area where pressure (force) is applied. The pressure sensor 211 may deliver at least one of a capacitance change signal indicating the detected change in capacitance or a resistance change signal indicating the detected change in resistance to the control unit 290. The capacitance change signal or the resistance change signal may include information on at least one of the intensity and direction of a force applied to the pressure sensor 211. The control unit 290 may obtain at least one of the direction and intensity of a force applied to the display unit 250 by using a capacitance change signal or a resistance change signal, which is received from the pressure sensor 211.

According to another embodiment of the present invention, the sensing unit 210, as shown in FIG. 1C, may include a plurality of acceleration sensors 213-1 to 213-4. When the display unit 250 has a rectangular form, each acceleration sensor may be disposed adjacent to each vertex of a rectangle. When the display unit 250 includes a deformable substrate and an image display unit described later, the plurality of acceleration sensors 213-1 to 213-4 may be disposed at a lower end of the deformable substrate and the image display unit may be disposed at an upper end of the deformable substrate but this is just exemplary and they may be built in the deformable substrate or the image display unit.

The acceleration sensor is a sensor for detecting an acceleration when object moves or the intensity of impact.

When the acceleration sensor is used, a movement state of the display unit 250 is detected in more detail. The acceleration sensor may sense an acceleration of the display unit 250 in a direction of each of three axes (for example, an x-axis, a y-axis, and a z-axis) vertical to each other. The control unit 290 may obtain a movement speed by using the accelerations of the 3-axes directions measured through the acceleration sensor. The control unit 290 may obtain a distance that the display unit 250 extends in the 3-axes directions by using the obtained movement speed. The control unit 290 may obtain the direction and intensity of force applied to the display unit 250 by using a movement speed and a movement distance obtained by using an acceleration sensor. The control unit 290 may expand the display unit 250 according to the obtained direction and intensity of force.

According to another embodiment of the present invention, the sensing unit 210 may include a plurality of hole sensors. The plurality of hole sensors may be disposed inside or on the display unit 250. When the sensing unit 210 includes a plurality of hole sensors, the control unit 290 may expand or reduce the display unit 250 through a voltage detected from a hole sensor according to a force applied to the display unit 250.

The display unit 250 may be stretched in at least one direction. The display unit 250 may include a deformable substrate and an image display unit. The deformable substrate may be configured with polydimethylsiloxane (PDMS) having excellent stretchability and may be expanded according to pulling force. An image display unit may be formed on the deformable substrate and may be expanded as the deformable substrate expands. The image display unit may display an image.

The display unit 250 may include an organic light emitting diode (OLED).

The storage unit 270 may match the intensity of a force applied to the display unit 250 and the expansion or reduction degree of the display unit 250 corresponding to the intensity of force and store them. The expansion degree of the display unit 250 may represent a length that the display unit 250 expands and the reduction degree of the display unit 250 may represent a length that the display unit 250 is reduced.

The control unit 290 may expand or reduce the display unit 250 according to a force detected through the sensing unit 210. The expansion of the display unit 250 may represent that the size of a screen displayed by the display unit 250 is enlarged and the reduction of the display unit 250 may represent that the size of a screen displayed by the display unit 250 is reduced. The control unit 290 may change a graphic or image displayed on a screen as the screen size of the display unit 250 is enlarged or reduced.

Besides that, the control module 290 may control overall operations of the deformable display device 200. More specific operations of the control unit 290 are described with reference to the drawings.

Figure 2A:
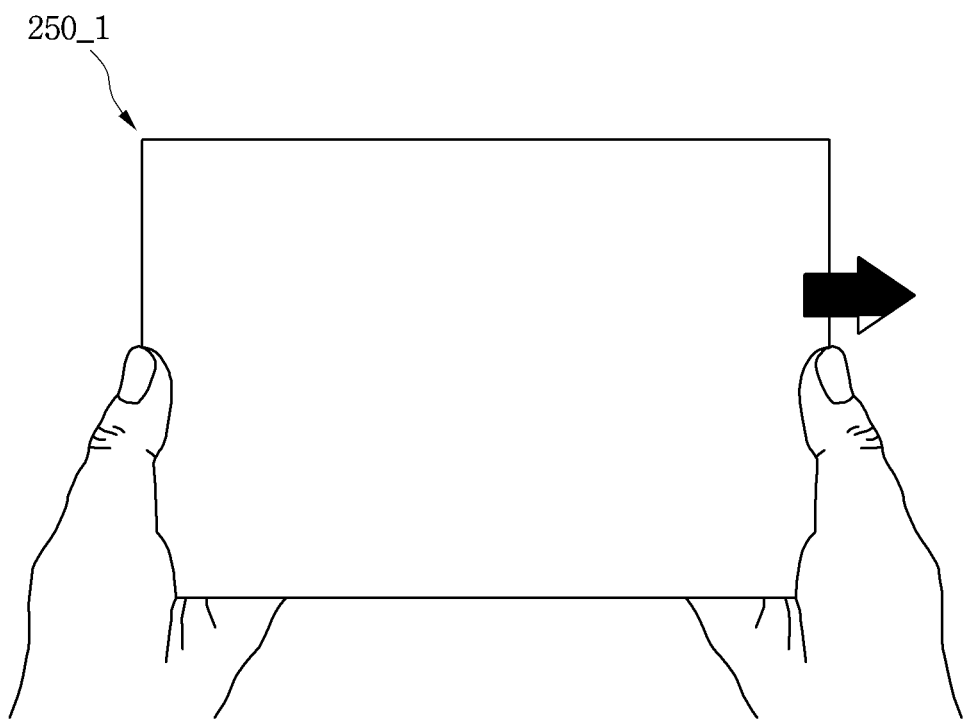
FIGS. 2A and 2B are views illustrating a usage example of a stretchable display device that is an example of a deformable display device.
Figure 2A:
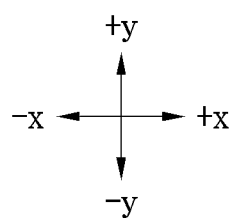
Figure 2B:
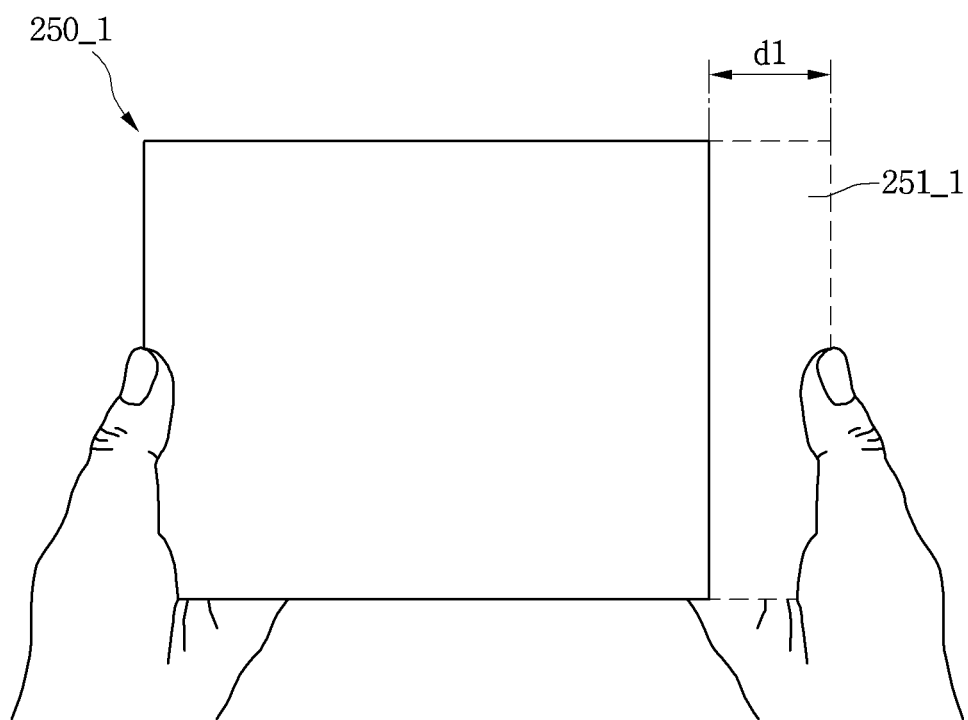
Figure 2B:
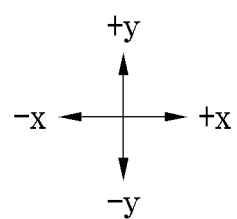

FIGS. 2A and 2B are views illustrating a usage example of a stretchable display device that is an example of a deformable display device.

FIG. 2A illustrates a display unit 250_1 of a state before a stretchable display unit 200_1 is stretched. In this state, when force is applied to the display unit 250_1 in a +x axis direction, the control unit 290, as shown in FIG. 2B, may expand the display unit 250_1 by an expansion distance d1 in the +x axis direction. As the display unit 250_1 expands, it may expand by an expansion area 251_1 corresponding to the expansion distance d1. That is, the screen size of the display unit 250 may be expanded by the expansion area 251_1. Although only a force applied in the +x axis direction is described with reference to FIG. 2, this is just exemplary. On the other hand, when force is applied to the display unit 250_1 in the −x axis direction, the control unit 290 may return the display unit 250_1 to its original size.

Figure 3C:
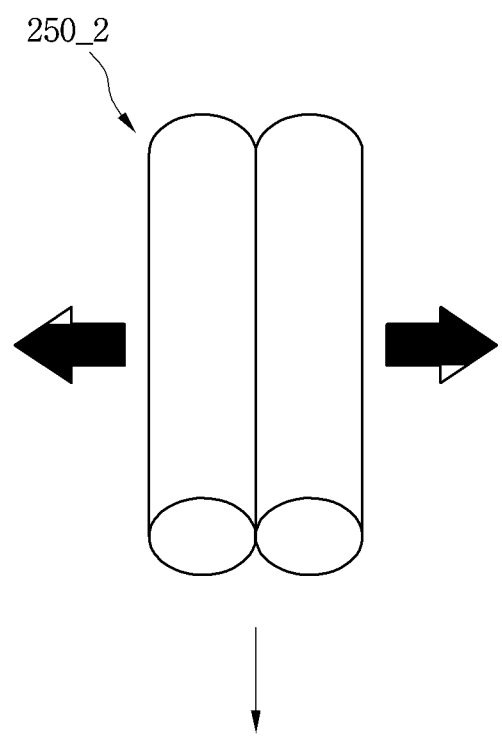
Figure 3C:
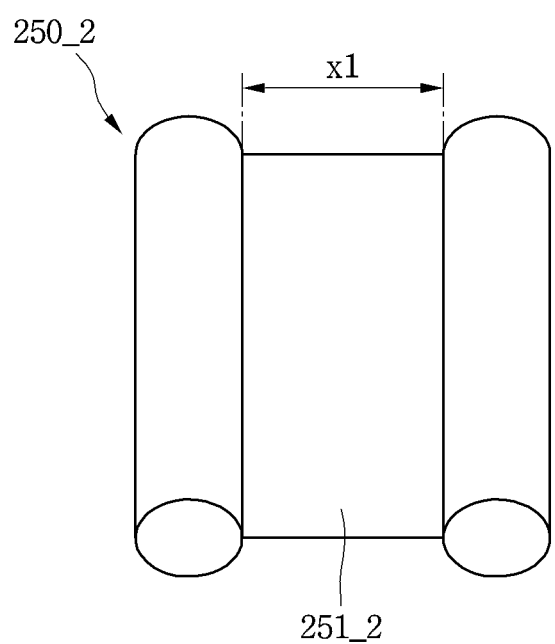

FIGS. 3A and 3C are views illustrating a usage example of a rollable display device that is an example of a deformable display device.

Referring to FIG. 3A, the display unit 250_2 of the rollable display device 200_2 is in a rolled state like paper. In this state, when force is applied to the display unit 250_2 in the −x axis direction, the control unit 290, as shown in FIG. 3B, may unfold the display unit 250_2 by a distance x1. As the display unit 250_2 is unfolded by the distance x1, it may expand by an unfolded area 251_2. That is, the screen size of the display unit 250 may be expanded by the unfolded area 251_2.

The rollable display device 200_2 may be unfolded in both directions according to a force applied in the both directions. A user may expand the display unit 250_2 according to an unfolding operation with both hands. That is, as shown in FIG. 3C, In this state, when force is applied to the display unit 250_2 in +x axis and −x axis directions simultaneously, the control unit 290 may unfold the display unit 250_2 by the distance x1 in the +x axis and −x axis directions. Accordingly, the display unit 250_2 may be expanded by an area 251_2 corresponding to the unfolded distance x1. That is, the screen size of the display unit 250 may be expanded by the unfolded area 251_2.

The deformable display device 200 may include all of a configuration of a mobile terminal 100 described with reference to FIG. 4.

Then, a configuration of a mobile terminal in the deformable display device 200 will be described with reference to FIG. 4.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smartwatchs, smart glasses, and head mounted displays (HMDs)).

However, it is apparent to those skilled in the art that configurations according to embodiments of the present invention disclosed in this specification are applicable to stationary terminals such as digital TVs, desktop computers, and digital signage, except for the case applicable to only mobile terminals.

Figure 4:
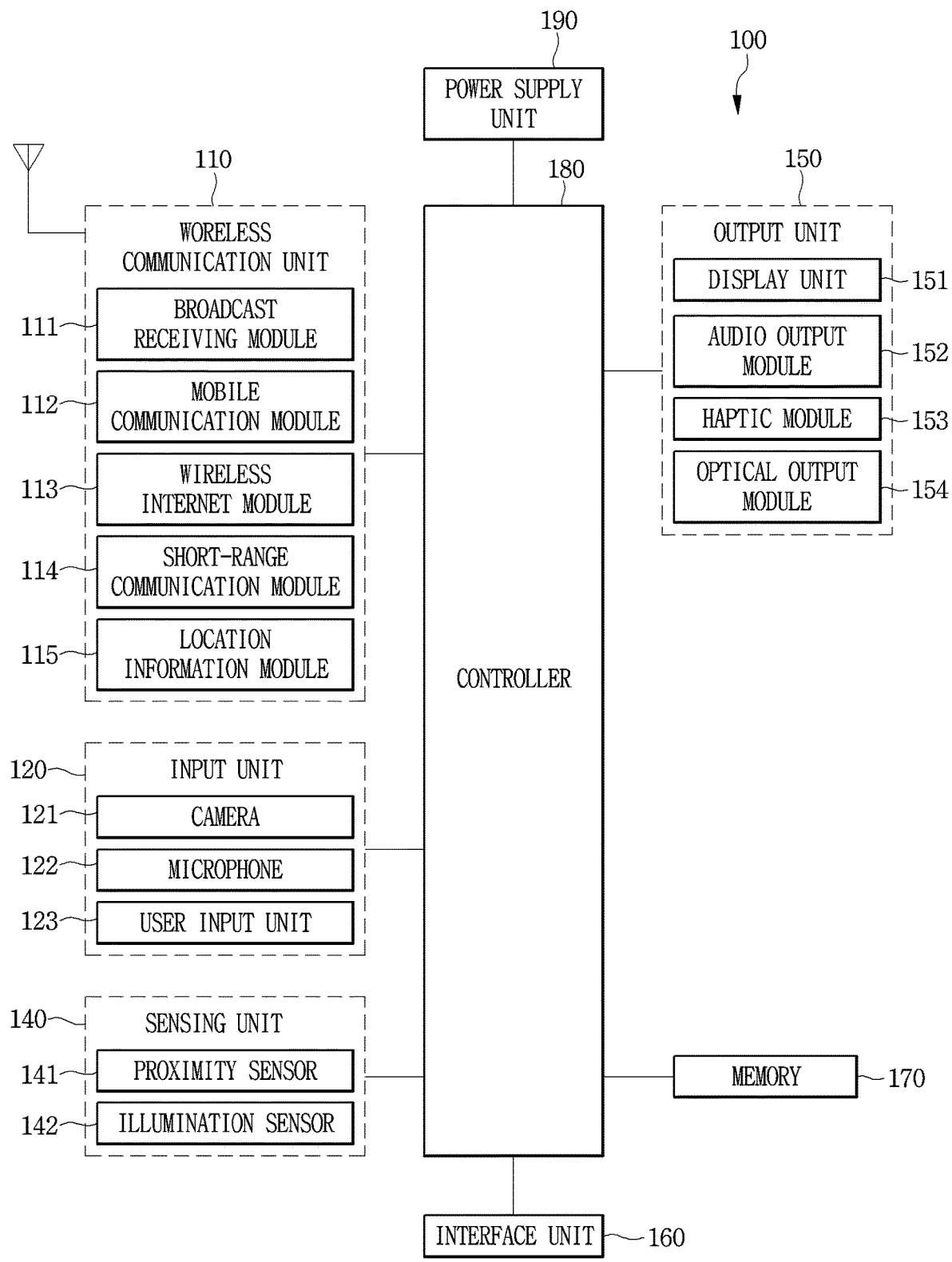
FIG. 4 is a block diagram illustrating a mobile terminal according to an embodiment of the present invention.

FIG. 4 is a block diagram illustrating a mobile terminal according to an embodiment of the present invention.

In this case, the deformable display device 200 may include the components of a mobile terminal 100. Especially, the sensing unit 210 of the deformable display device 200 may perform a function of a sensing unit 140 of the mobile unit 100, the display unit 250 may perform a function of the display unit 151 of the mobile terminal 100, and the storage 270 may perform a function of a memory 170 of the mobile terminal 100.

The mobile terminal 100 may include a wireless communication unit 110, an input unit 120, the sensing unit 140, an output unit 150, an interface unit 160, the memory 170, a control unit 180, and a power supply unit 190. In implementing a mobile terminal, components shown in FIG. 4 are not necessary, so that a mobile terminal described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless interne module 113, a short-range communication module 114, and a location information module 115.

The input unit 120 may include a camera 121 or an image input unit for image signal input, a microphone 122 or an audio input unit for receiving audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information inputted/outputted through the above components or executing application programs stored in the memory 170.

Additionally, in order to execute an application program stored in the memory 170, the control unit 180 may control at least part of the components shown in FIG. 4. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present invention described below. Additionally, the operations, controls, or control methods of a mobile terminal 100 may be implemented on the mobile terminal 100 by executing at least one application program stored in the memory 170.

Hereinafter, prior to examining various embodiments implemented through the mobile terminal 100, the above-listed components are described in more detail with reference to FIG. 4.

First, in describing the wireless communication unit 110, the broadcast receiving module 111 of the wireless communication unit 110 may receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching may be provided to the mobile terminal 100.

The mobile communication module 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission.

The wireless internet module 113 refers to a module for wireless internet access and may be built in or external to the mobile terminal 100. The wireless internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

Here, the other mobile terminal 100 may be a wearable device (for example, a smart watch, a smart glass, and an HMD) that is capable of exchanging data (or interworking) with the mobile terminal 100. The short-range communication module 114 may detect (or recognize) a wearable device around the mobile terminal 100, which is capable of communicating with the mobile terminal 100 Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user of the wearable device may use the data processed in the mobile terminal 100 through the wearable device. For example, according thereto, when a call is received by the mobile terminal 100, a user may perform a phone call through the wearable device or when a message is received by the mobile terminal 100, a user may check the received message.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position on the basis of information of a wireless access point (AP) transmitting/receiving a wireless signal to/from the Wi-Fi module, through the Wi-Fi module. If necessary, the position information module 115 may perform a function of another module in the wireless communication unit 110 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 120 is used for inputting image information (or signal), audio information (or signal), data, or information inputted from a user and the mobile terminal 100 may include at least one camera 121 in order for inputting image information. The camera 121 processes image frames such as a still image or a video obtained by an image sensor in a video call mode or a capturing mode. The processed image frame may be displayed on the display unit 151 or stored in the memory 170. Moreover, a plurality of cameras 121 equipped in the mobile terminal 100 may be arranged in a matrix structure and through the camera 121 having such a matrix structure, a plurality of image information having various angles or focuses may be inputted to the input terminal 100. Additionally, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the control unit may control an operation of the mobile terminal 100 to correspond to the inputted information. The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and may be disposed on a touch screen and for example, may include graphic, text, icon, video, or a combination thereof.

Moreover, the sensing unit 140 may sense at least one of information in a mobile terminal, environmental information around a mobile terminal, and user information and may then generate a sensing signal corresponding thereto. On the basis of such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor detects a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressured when touched, and a capacitance when touched. Here, the touch target, as an object applying a touch on the touch sensor, may be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-mentioned touch sensor and proximity sensor are provided separately or combined and may thus sense various types of touches, for example, short (or tap) touch), long touch, multi touch, drag touch, flick touch, pinch-in touch, pinch-out touch, swipe touch, and hovering touch for the touch screen.

The ultrasonic sensor may recognize position information of a detection target by using ultrasonic waves. Moreover, the control unit 180 may calculate the position of a wave source through information detected by an optical sensor and a plurality of ultrasonic sensors. The position of the wave source may be calculated by using the property that light is much faster than ultrasonic wave, that is, a time that light reaches an optical signal is much shorter than a time that ultrasonic wave reaches an ultrasonic sensor. In more detail, the position of the wave source may be calculated by using a time difference with a time that ultrasonic wave reaches by using light as a reference signal.

Moreover, the camera 121 described as a configuration of the input unit 120 may include at least one of a camera sensor (for example, CCD and CMOS), a photo sensor (or an image sensor), and a laser sensor.

The camera 121 and the laser sensor may be combined to detect a touch of a detection target for a three-dimensional image. The photo sensor may be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Additionally, the display unit 151 may be configured as a three-dimensional display unit displaying a three-dimensional image.

A three-dimensional display method, for example, a stereoscopic method (a glasses method), an autostereoscopic (no glasses method), a projection method (a holographic method) may be applied to the three-dimensional display unit The sound output unit 152 may output audio data received from the wireless communication unit 110 or stored in the memory 170 in a call signal reception or call mode, a recording mode, a voice recognition mode, or a broadcast reception mode. The sound output unit 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal outputted from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal 100 is accurately mounted on the cradle.

The memory 170 may store a program for an operation of the control unit 180 and may temporarily store input/output data (for example, a phone book, a message, a still image, and a video). The memory 170 may store data on various patterns of vibrations and sounds outputted during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an output of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various embodiments described below on the mobile terminal 100.

The power supply unit 190 may receive external power or internal power under a control of the control unit 180 and may then supply power necessary for an operation of each component. The power supply unit 190 includes a battery. The battery is a rechargeable built-in battery and may be detachably coupled to a terminal body in order for charging.

Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Moreover, various embodiments below may be implemented in a computer or device similar thereto readable medium by using software, hardware, or a combination thereof.

Then, a communication system using the mobile terminal 100 is described according to an embodiment of the present invention.

First, the communication system may use different wireless interfaces and/or physical layers. For example, a wireless interface available to the communication system may include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system may include at least one terminal 100, at least one base station (BS) (it may be referred to as Node B or Evolved Node B), at least one base station controllers (BSCs), and a mobile switching center (MSC). MSC may be configured to be connected to Public Switched Telephone Network (PSTN) and BSCs. BSCs may be connected being paired with a BS through a backhaul line. The backhaul line may be provided according to at least one of E1/T1, ATM, IP, PPP, Frame Relay, HDSL, ADSL, and xDSL. Accordingly, a plurality of BSCs may be included in a CDMA wireless communication system.

Each of a plurality of BSs may include at least one sensor and each sensor may include an omni-directional antenna or an antenna indicating a specific radial direction from a BS. Additionally, each sensor may include at least two antennas in various forms. Each BS may be configured to support a plurality of frequency allocations and each of the plurality of frequency allocations may have a specific spectrum (for example, 1.25 MHz, 5 MHz, and so on).

The intersection of a sector and a frequency allocation may be referred to as a CDMA channel. A BS may be referred to as a Base Station Transceiver Subsystem (BTS). In such a case, one BSC and at least one BS together may be referred to as "BS". A BS may also represent "cell site". Additionally, each of a plurality of sectors for a specific BS may be referred to as a plurality of cell sites.

A Broadcasting Transmitter (BT) transmits broadcast signals to the terminals 100 operating in a system. The broadcast reception module 111 shown in FIG. 36 is provided in the terminal 100 for receiving broadcast signals transmitted from the BT.

Additionally, GPS may be linked to a CDMA wireless communication system in order to check the location of the mobile terminal 100. Then, a satellite helps obtaining the location of the mobile terminal 100. Useful location information may be obtained by at least one satellite. Herein, the location of the mobile terminal 100 may be traced by using all techniques for tracing the location in addition to GPS tracking technique. Additionally, at least one GPS satellite may be responsible for satellite DMB transmission selectively or additionally.

The location information module 115 in a mobile terminal is for detecting and calculating the position of the mobile terminal and its representative example may include a GPS module and a WiFi module. If necessary, the position information module 115 may perform a function of another module in the wireless communication unit 110 in order to obtain data on the location of the mobile terminal substitutionally or additionally.

The GPS module 115 may calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 may speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) may be utilized.

WPS is a technique for tracking the location of the mobile terminal 100 by using a WiFi module in the mobile terminal 100 and a wireless Access Point (AP) for transmitting or receiving wireless signals to or from the WiFi module and may mean a Wireless Local Area Network (WLAN) based location measurement technique using WiFi.

A WiFi location tracking system may include a WiFi location measurement server, a mobile terminal 100, a wireless AP connected to the mobile terminal 100, and a database for storing arbitrary wireless AP information.

The mobile terminal 100 in access to a wireless AP may transmit a location information request message to a WiFi location measurement server.

The WiFi location measurement server extracts information of a wireless AP connected to the mobile terminal 100 on the basis of a location information request message (or signal) of the mobile terminal 100. Information of a wireless AP connected to the mobile terminal 100 may be transmitted to the WiFi location measurement server through the mobile terminal 100 or may be transmitted from a wireless AP to a WiFi location measurement server.

Based on the location information request message of the mobile terminal 100, the extracted information of a wireless AP may be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server may extract wireless AP information corresponding to a wireless AP that the mobile terminal 100 access from a pre-established database by using information of the wireless AP connected to the mobile terminal 100. At this point, information of arbitrary wireless APs stored in the database may information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server may extract only a predetermined number of wireless AP information in high RSSI order.

Then, the WiFi location measurement server may extract (or analyze) the location information of the mobile terminal 100 by using at least one wireless AP information extracted from the database. By comparing the included information and the received wireless AP information, location information of the mobile terminal 100 is extracted (or analyzed).

As a method of extracting (or analyzing) the location information of the motile terminal 100, a Cell-ID method, a finger-print method, a triangulation method, and a landmark method may be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but when the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information. Time of Arrival (ToA), Time Difference of Arrival (TDoA), and Angle of Arrival (AoA) may be used.

The landmark method is a method for measuring the location of a mobile terminal by using a landmark transmitter knowing the location.

In addition to the listed methods, a variety of algorithms may be utilized as methods for extracting (or analyzing) the location information of a mobile terminal.

As the extracted location information of the mobile terminal 100 is transmitted to the mobile terminal 100 through the WiFi location measurement server, the mobile terminal 100 may obtain the location information.

As connected to at least one wireless AP, the mobile terminal 100 may obtain location information. At this point, the number of wireless APs, which are required for obtaining the location information of the mobile terminal 100, may vary according to a wireless communication environment where the mobile terminal 100 is located.

Then, various embodiments for an operating method of the deformable display device 200 are described. Embodiments of the present invention may be applied to the stretchable display device 200_1 described with reference to FIGS. 2A to 2B and the rollable display device 200_2 described with reference to FIGS. 3A to 3C.

Figure 5:
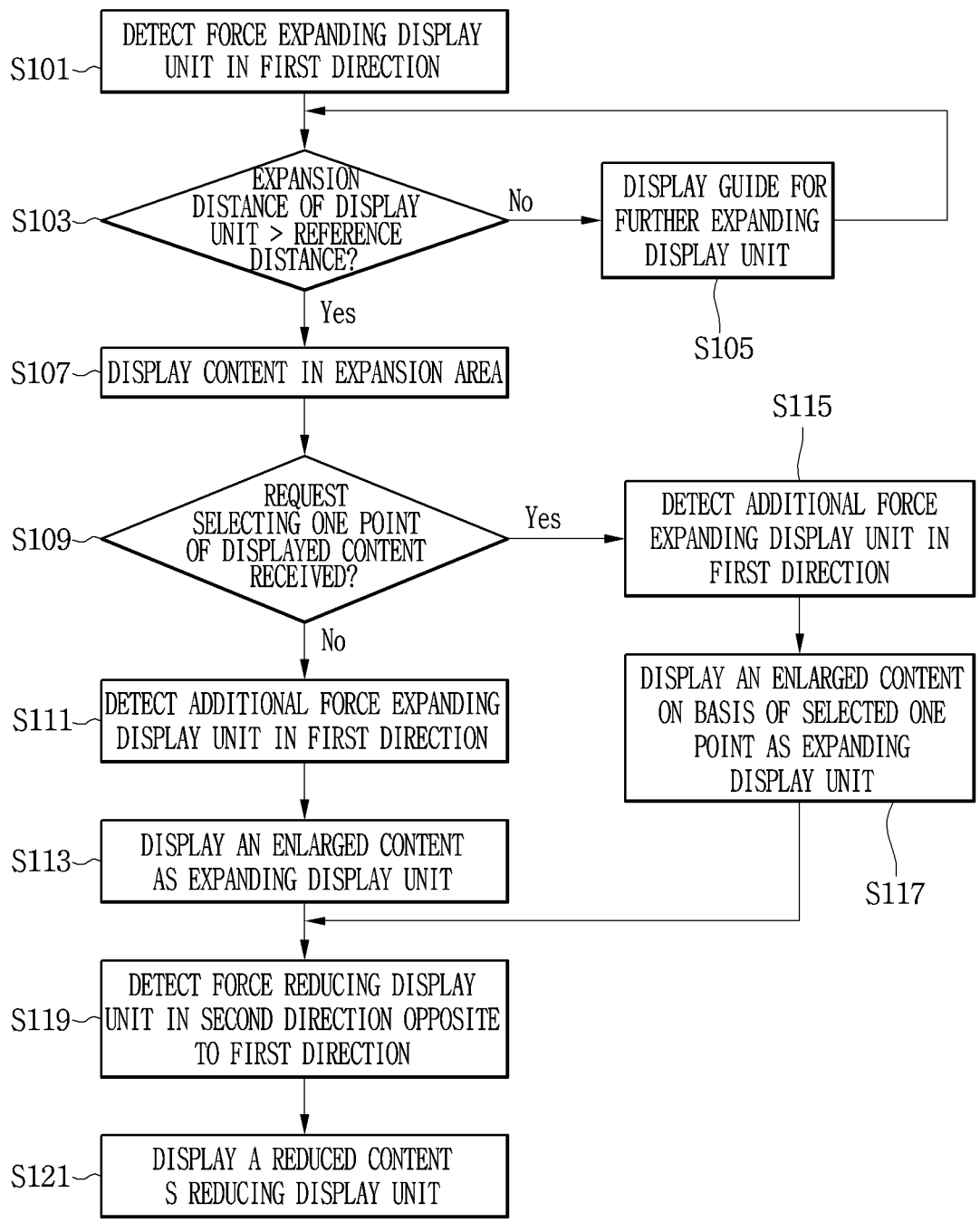
FIG. 5 is a flowchart illustrating an operating method of a deformable display device according to another embodiment of the present invention.

FIG. 5 is a flowchart illustrating an operating method of a deformable display device according to another embodiment of the present invention.

Although it is assumed below that the deformable display device 200 is the rollable display device 200_2, the present invention is not limited thereto and this may be applicable to the stretchable display device 200_1 where the display unit 250 is expanded or reduced.

The control unit 290 of the deformable display device 200 detects a force for expanding the display unit 250 in the first direction through the sensing unit 210 in operation S101. According to an embodiment of the present invention, the first direction may be the +x axis direction but this is just exemplary and the first direction may be any direction that the display unit 250 may expand.

The control unit 290 expands the display unit 250 according to the detected force and checks whether an expansion distance, which is a distance that the display unit 250 expands, is equal to or greater than a reference distance in operation S103. According to an embodiment of the present invention, the display unit 250 may expands the display unit 250 by a distance corresponding to the intensity of a force detected in the first direction. Expanding the display unit 250 may represent expanding the screen that the display unit 250 displays. Expanding the display unit 250 may represent expanding the size of the screen that the display unit 250 displays. The expansion distance of the display unit 250 may be a distance that the screen that the display unit 250 displays is expanded.

According to an embodiment of the present invention, a reference distance may be a minimum distance necessary for displaying content in an expansion area of the display unit 250. In more detail, a reference distance may represent a minimum distance necessary for displaying original content in an expansion area of the display unit 250.

When the expansion distance of the display unit 250 is less than a reference distance, the control unit 290 may display a guide for further expanding the display unit 250 in an expansion area of the display unit 250 in operation S105. Operation S105 will be described with reference to FIGS. 6A to 6C.

Figure 6A:
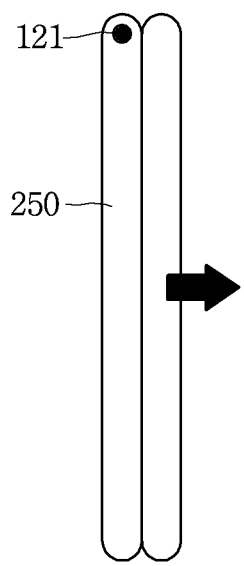
FIGS. 6A to 6C are views illustrating a guide displayed in an expansion area when an expansion distance of a display unit is less than a reference distance according to an embodiment of the present invention.
Figure 6B:
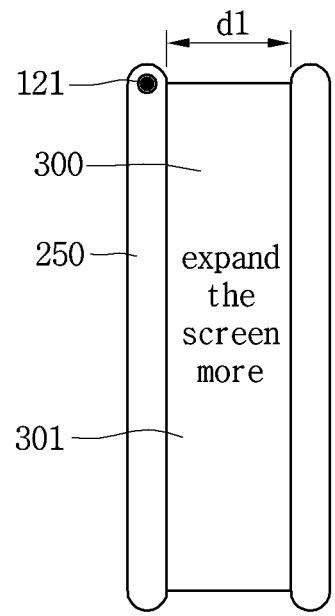
Figure 6B:
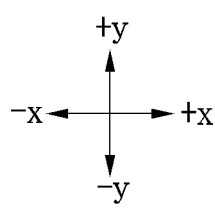
Figure 6C:
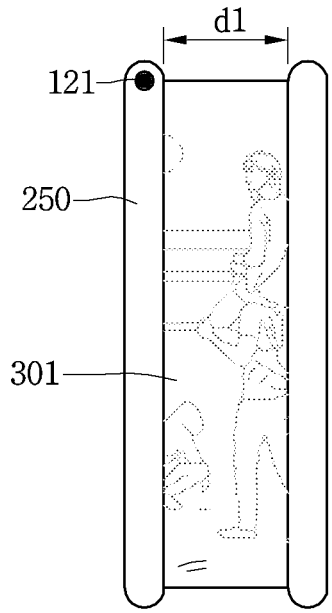

FIGS. 6A to 6C are views illustrating a guide displayed in an expansion area when an expansion distance of a display unit is less than a reference distance according to an embodiment of the present invention.

FIG. 6A is a view illustrating a state of the display unit 250 before the rollable display device 200) is deformed. When force is applied to the display unit 250_1 in the +x axis direction, the control unit 290, as shown in FIG. 6B, may expand the display unit 250 by an expansion area 300 corresponding to an expansion distance d1 in the +x axis direction. The control unit 290 may perform a control on the display unit 250 to display a guide 301 for "expand the screen more" in the expansion area 300 as expanding the display unit 250.

According to another embodiment of the present invention, when force is applied to the display unit 250 in the +x axis direction, the control unit 290, as shown in FIG. 6C, may expand the display unit 250 by an expansion area 300 corresponding to an expansion distance d1 in the +x axis direction. The control unit 290 may perform a control on the display unit 250 to display an unfinished version of content 303 implying content to be displayed next in the expansion area 300 as expanding the display unit 250. The unfinished version of content 303 may be content provided by displaying original content blurredly but this is just exemplary.

Again, FIG. 5 is described.

Moreover, when the expansion distance of the display unit 250 is equal to or greater than a reference distance, the control unit 290 displays content in the expansion area of the display unit 250 in operation S107. According to an embodiment of the present invention, when the expansion distance of the display unit 250 is equal to or greater than a reference distance, the control unit 290 may allow an operating mode of the deformable display device 200 into a capture mode. In this case, content displayed in the expansion area of the display unit 250 may be a preview image of a subject. The capture mode is a mode for capturing an image of a subject to obtain image or video. When the deformable display device 200 enters a capture mode, the control unit 290 may turn on the camera 121 shown in FIGS. 6B and 6C.

According to another embodiment of the present invention, when the expansion distance of the display unit 250 is equal to or greater than a reference distance, the control unit 290 may execute a specific application and may display an execution screen or content, which is provided from the executed application, in the expansion area of the display unit 250. Here, the specific application may be an application preset by a user and an application set by default. For example, the specific application may be one of a capture application for capturing a subject, a gallery application for providing pictures and videos, and a map application for providing map information.

The control unit 290 checks whether a request for selecting one point of content displayed in the expansion area of the display unit 250 is received in operation S109 and if the request is not received, detects an additional force for expanding the display unit 205 in the first direction in operation S111.

The control unit 290 displays an enlarged content as expanding the display unit 250 according to the additional force in operation S113.

According to an embodiment of the present invention, the control unit 290 may display an enlarged the content to correspond to the size of an area where the display unit 250 is expanded. In more detail, the control unit 290 may perform a control on an output of content to enlarge the content according to an expansion ratio of the display unit 250.

According to an embodiment of the present invention, the control unit 290 may display an enlarged content to correspond to the size of an area where the display unit 250 is expanded. Operation S111 will be described with reference to FIGS. 7A to 7D.

FIGS. 7A to 7J are views of enlarging and displaying content according to a degree that a display unit is expanded according to an embodiment of the present invention.

Figure 7A:
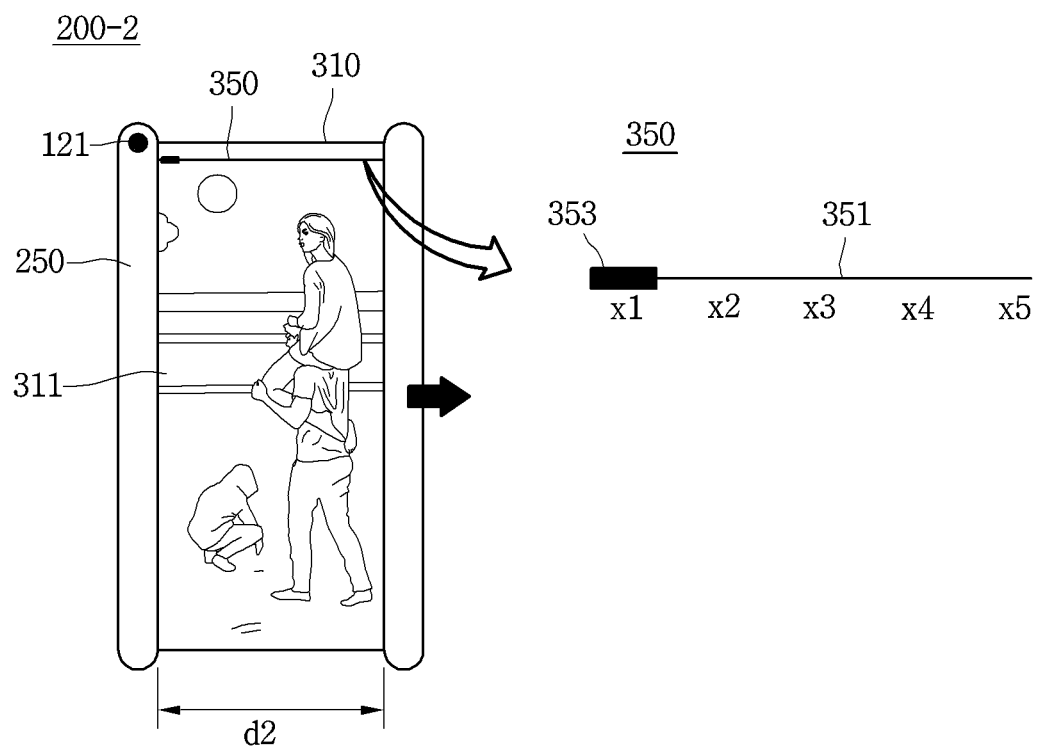
FIGS. 7A to 7J are views of enlarging and displaying content according to a degree that a display unit is expanded according to an embodiment of the present invention.

Referring to FIG. 7A, the screen of the display unit 250 is in a state of being expanded in the +x axis direction by the expansion area 310 corresponding to the expansion distance d2. The expansion distance d2 may be greater than the expansion distance d1 described with reference to FIGS. 6B and 6C and may be equal to or greater than a reference distance. The control unit 290 may perform a control on the display unit 250 to display content 311 in the expansion area 310. The content 311 displayed in the expansion area 310 may be a preview image as the rollable display device 200_2 enters a capture mode but this is just exemplary and the content 311 may be content displayed according to an additional display request.

A ratio indicator 350 may be displayed on the expansion area 310 of the display unit 250. The ratio indicator 350 may be an indicator for representing what ratio the content 311 or the screen displayed on the display unit 250 is enlarged and what ratio it is expandable. The ratio indicator 350 may include an enlargement/reduction guide bar 351 and a ratio box 353. The enlargement/reduction guide bar 351 may be a guide bar for providing what degree of a ratio the content 311 is enlarged or reduced or what degree of a ratio the expansion or reduction is available. The ratio box 353 may be a box for notifying what ratio the currently displayed content 311 or screen is enlarged or reduced. The ratio indicator 350 may be displayed on the upper side of the displayed content 311 but this is just exemplary. The ratio indicator 350 may further ratio numerical values X1, X2, X3, X4, and X5 obtained by digitizing an enlargement or reduction ratio at a lower side of the enlargement/reduction guide bar 351. The ratio numerical value X1 may correspond to the minimum size of content to be reduced the ratio numerical value X5 may correspond to the maximum size of content to be enlarged. Referring to FIG. 7A, the ratio box 353 may be disposed on the enlargement/reduction guide bar 351 to correspond to the ratio numeral value X1. That is, the content of the original size 311 is in a state of not being expanded, that is, its enlargement ratio numerical value is 1. The ratio numeral value X1 may be a numerical value representing the minimum size that content is displayed. The color of the ratio box 353 disposed in correspondence to the ratio numeral value X1 may be different from the colors of the ratio box 353 disposed in correspondence to other ratio numerical values X2, X3, and X4. A user may check that the content 311 cannot be reduced any more through the color of the ratio box 353.

Figure 7B:
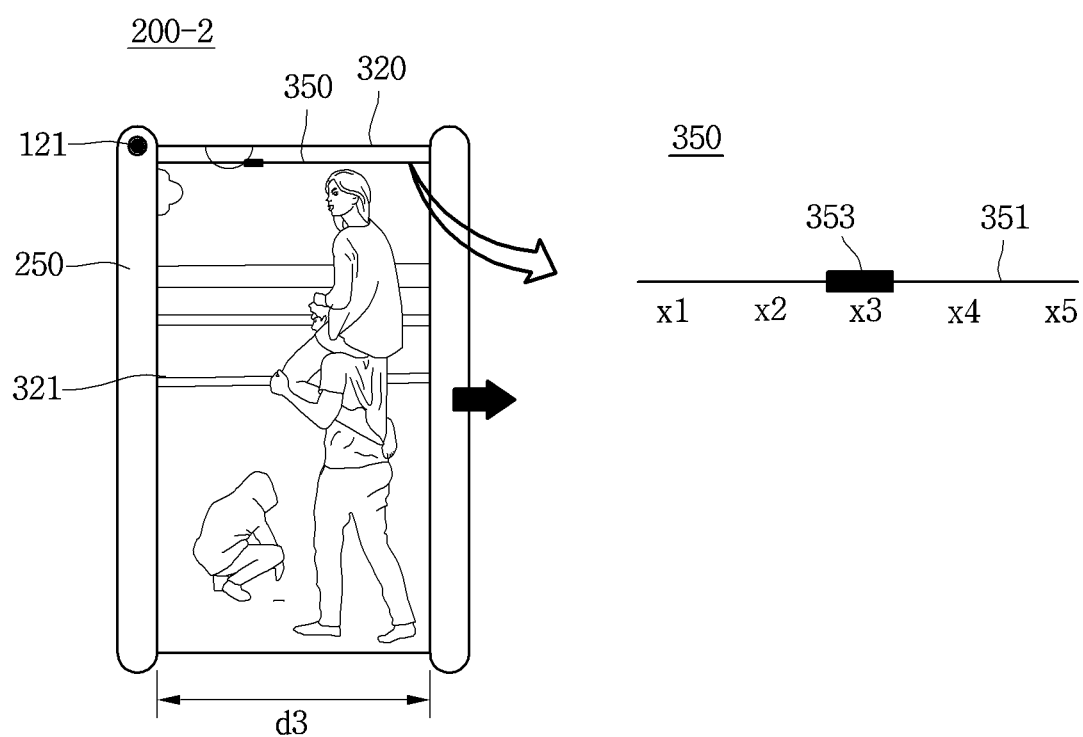

When an additional force for expanding the display unit 250 in the +x axis direction is applied in FIG. 7A, the control unit 290, as shown in FIG. 7B, may expand the screen of the display unit 250 by an expansion area 320 corresponding to an expansion distance d3. The size of the expansion area 320 of FIG. 7B may be greater than the size of the expansion area 310 of FIG. 7A. As the screen size of the display unit 250 becomes larger, the control unit 290 may display in the expansion area 320 the content 321 that is three times enlarged than the original size. The ratio box 353 may be disposed on the enlargement/reduction guide bar 351 to correspond to the ratio numeral value X3. The ratio numerical value X3 may correspond to the size of the expansion area 320 or the expansion distance d3 of the display unit 250.

Figure 7C:
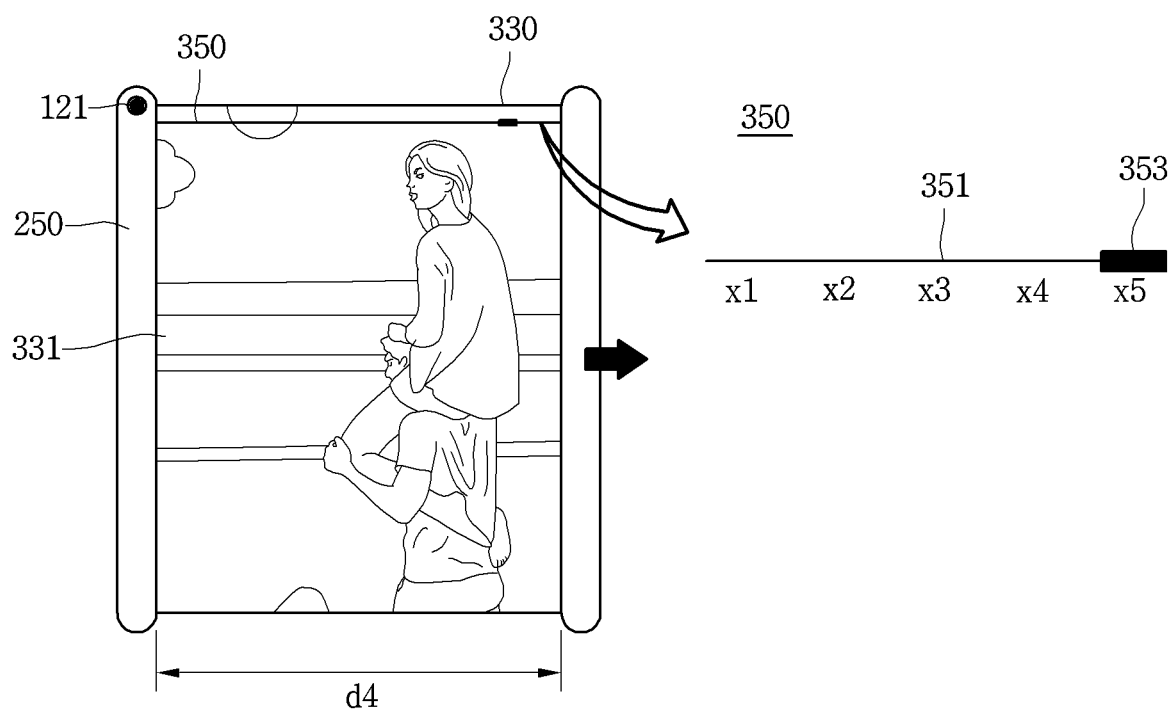
Figure 7D:
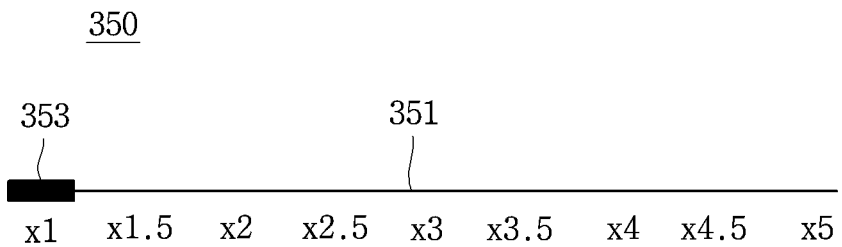

When an additional force for expanding the display unit 250 in the +x axis direction is applied in FIG. 7B, the control unit 290, as shown in FIG. 7C, may expand the screen of the display unit 250 by an expansion area 330 corresponding to an expansion distance d4. The size of the expansion area 330 of FIG. 7C may be greater than the size of the expansion area 310 of FIG. 7B. As the screen size of the display unit 250 becomes larger, the control unit 290 may display in the expansion area 330 the content 331 that is five times enlarged than the original size. The ratio box 353 may be disposed on the enlargement/reduction guide bar 351 to correspond to the ratio numeral value X5. The ratio numerical value X5 may correspond to the size of the expansion area 330 or the expansion distance d4 of the display unit 250. The color of the ratio box 353 disposed in correspondence to the ratio numeral value X5 may be different from the colors of the ratio box 353 disposed in correspondence to other ratio numerical values X2, X3, and X4. A user may check that the content 331 cannot be enlarged any more through the color of the ratio box 353.

Moreover, a ratio numerical value included in the ratio indicator 350 may be further divided and displayed. That is, referring to the ratio indicator 350 of FIG. 7D, a ratio numerical value may be further divided into X1, X1.5, X2, X2.5, X3, X3.5, X4, X4.5, and X5 in comparison to FIGS. 7A to 7C.

In such a way, the control unit 290 may display an enlarged content of an original size according to a degree that the screen size of the display unit 250 is expanded. On the other hand, the control unit 290 may reduce and display content of an original size according to a degree that the screen size of the display unit 250 is reduced. That is, as a force for reducing the display unit 250 in the −x axis direction is applied in FIG. 7C, as shown in FIGS. 7B and 7A, content may be reduced and displayed.

A user may view enlarged content only with an operation of expanding the display unit 250 and may view reduced content only with an operation of reducing the display unit 250. Additionally, a user may check easily what degree the current content is enlarged or reduced through the ratio indicator 350.

FIGS. 7A to 7C are views illustrating content enlarged and displayed in the entire area that is expanded as the screen of the display unit 250 is expanded but unlike this, content is not enlarged and displayed in the entire expanded area and as an empty area occurs, content may be enlarged to correspond to the original ratio of the content. This will be described with reference to FIGS. 7E to 7F.

Figure 7E:
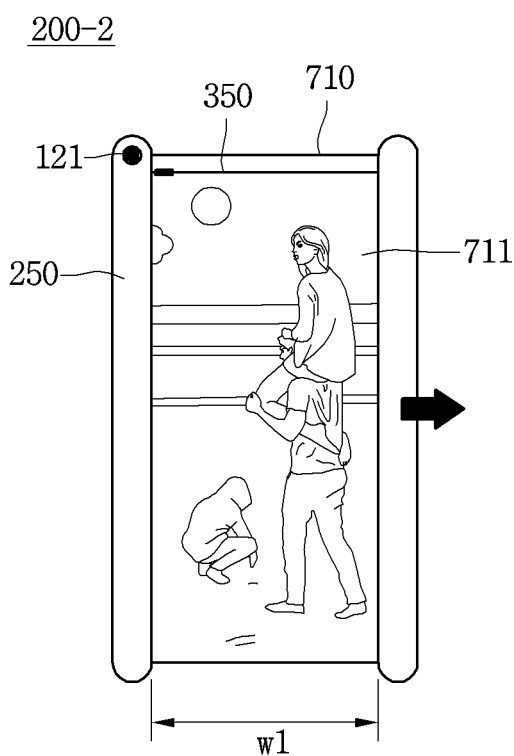
Figure 7F:
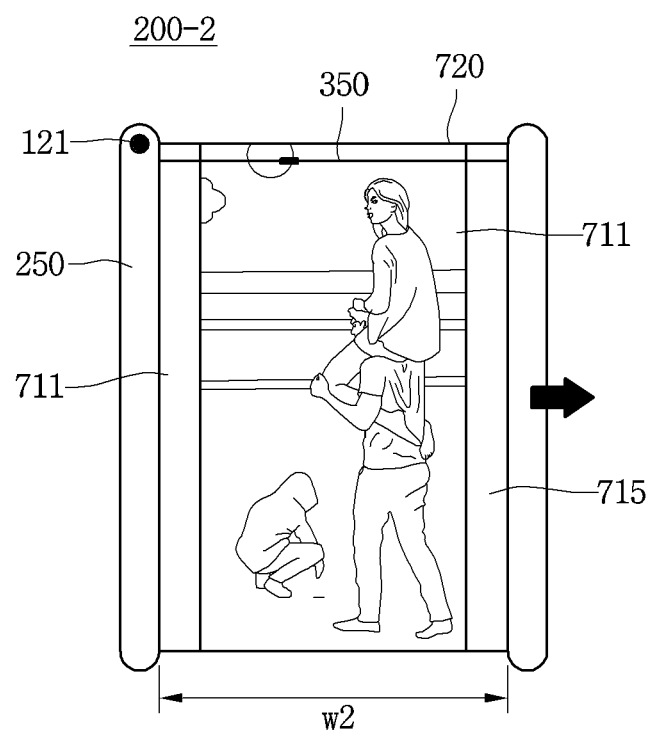

First, referring to FIG. 7E, the screen size of the display unit 250 of the rollable display device 200_2 is in a state of being expanded by a first area 710 corresponding to a first distance W2 and content 711 and a ratio indicator 350 are displayed in the first area 710. Description for the ratio indicator 350 in FIG. 7E is replaced with the description for the ratio indicator 350 in FIGS. 7A to 7D. When force is applied to the display unit 250 in the +x axis direction, the control unit 290, as shown in FIG. 7F, may expand the screen that the display unit 250 displays by a second area 720 corresponding to a second distance w2. The second distance w2 may be greater than the first distance w1 and also the size of the second area 720 may be greater than the size of the first area 710. When the screen size of the display unit 250 is greater than a reference distance in the +x axis direction, as enlarging and displaying the content 711, the control unit 290 may dispose the content 711 at the center of the second area 720. The reference distance may be greater than the first distance w1 and less than the second distance w2. As the content 711 is enlarged to correspond to an original ratio, a first empty area 713 and a second empty area 715 may occur in the second area 720.

Figure 7G:
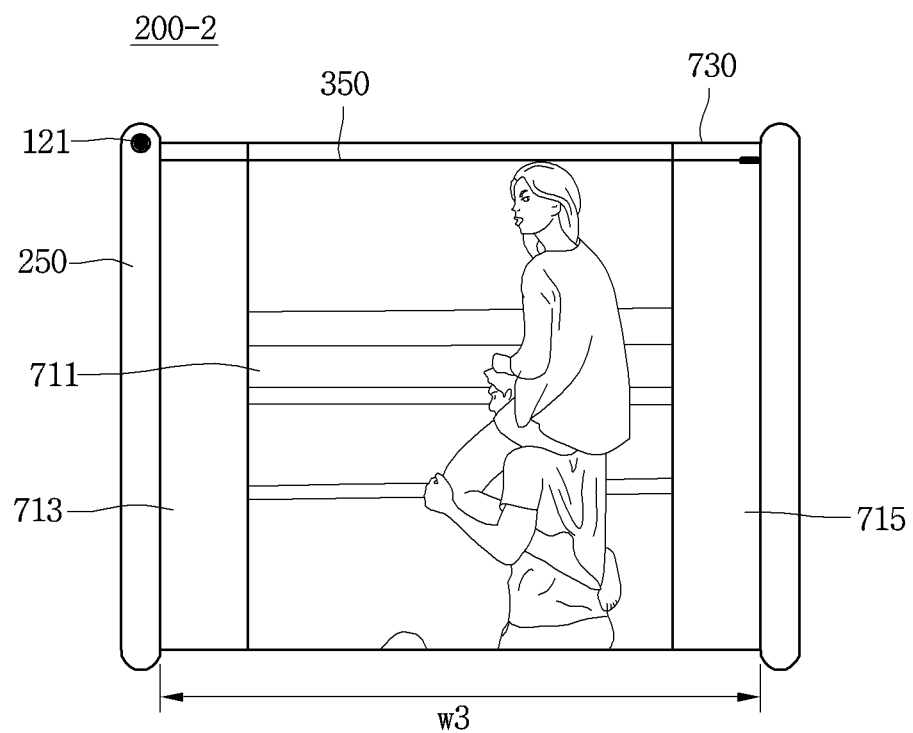

When an additional force is applied to the display unit 250 in the +x axis direction in FIG. 7F, the control unit 290, as shown in FIG. 7G, may expand the screen that the display unit 250 displays by a third area 730 corresponding to a third distance w3. The third distance w3 may be greater than the second distance w2 and also the size of the third area 730 may be greater than the size of the second area 720. When the screen size of the display unit 250 is greater than a reference distance in the +x axis direction, as enlarging and displaying the content 711, the control unit 290 may dispose the content 711 at the center of the third area 730 simultaneously. As the content 711 is further enlarged to correspond to an original ratio, a first empty area 713 and a second empty area 715 may occur in the third area 730. During a process for enlarging and displaying the content 711 according to the embodiments of FIGS. 7E to 7G, a partial image of the content 711 is cut out and may not be displayed on the display unit 250.

The embodiments of FIGS. 7E to 7G may be reversely applicable as the screen size of the display unit 250 is reduced.

Figure 7H:
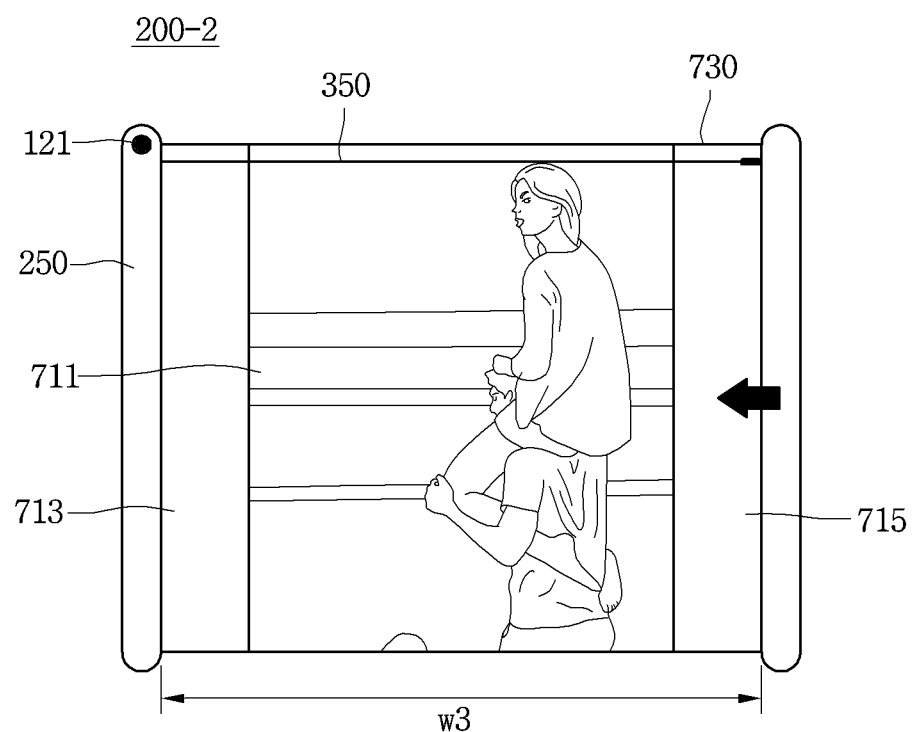
Figure 7I:
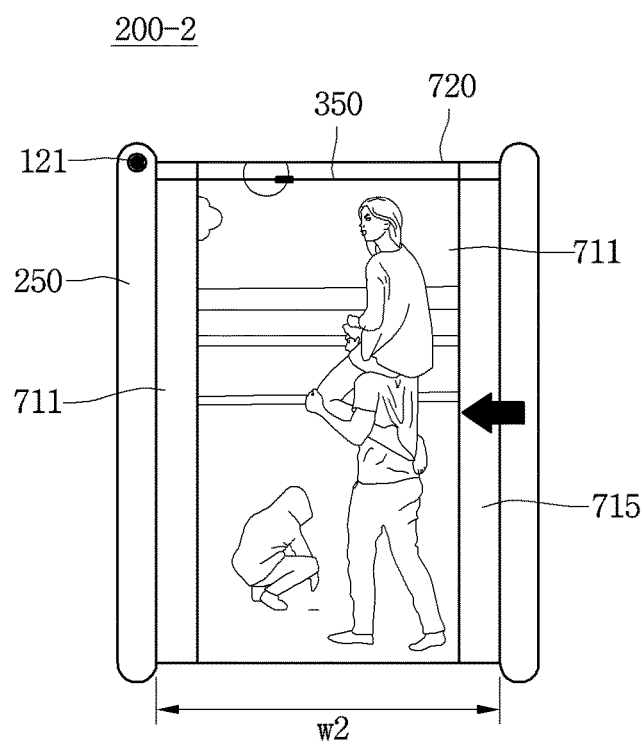
Figure 7J:
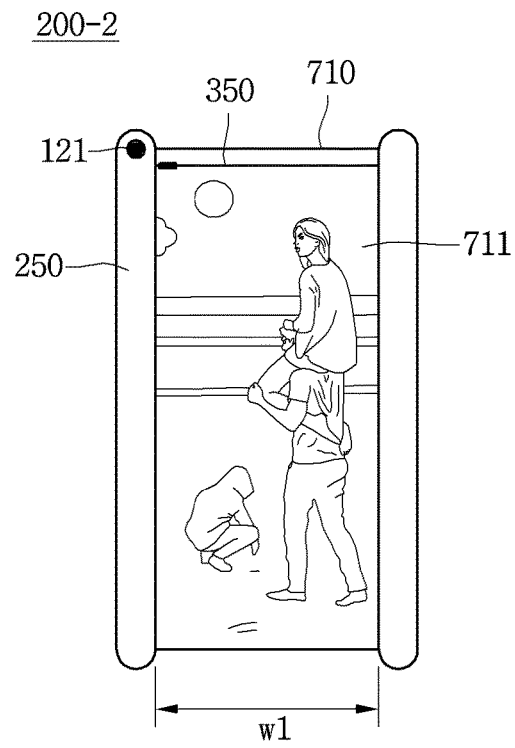

That is, referring to FIGS. 7H to 7J, as force is applied to the display unit 250 in the −x axis direction, the size of an empty area may be reduced and also the content 711 may be reduced to correspond to an original ratio and displayed. During a process for reducing and displaying the content 711 according to the embodiments of FIGS. 7H to 7J, a partial image of the content 711 not displayed before may be displayed on the display unit 250.

Moreover, according to another embodiment of the present invention, as a specific ratio numerical value is selected from the ratio indicator 350, content may be enlarged or reduced and then displayed.

Figure 8A:
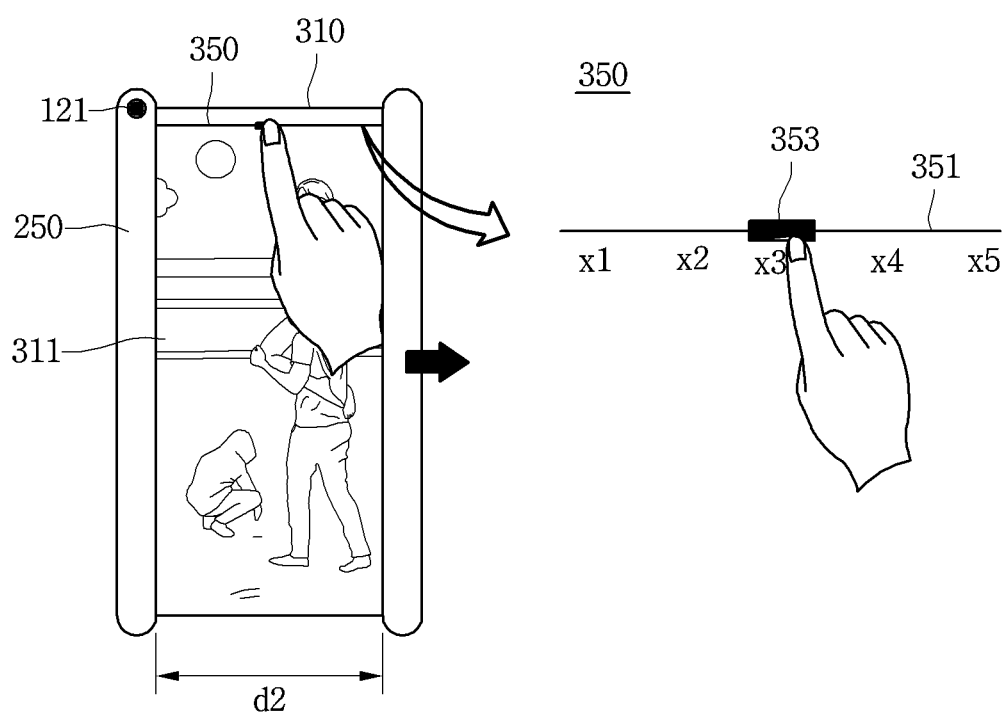
FIGS. 8A to 8C are views of enlarging and displaying content on a ratio indicator as a specific ratio numerical value is selected according to an embodiment of the present invention.
Figure 8B:
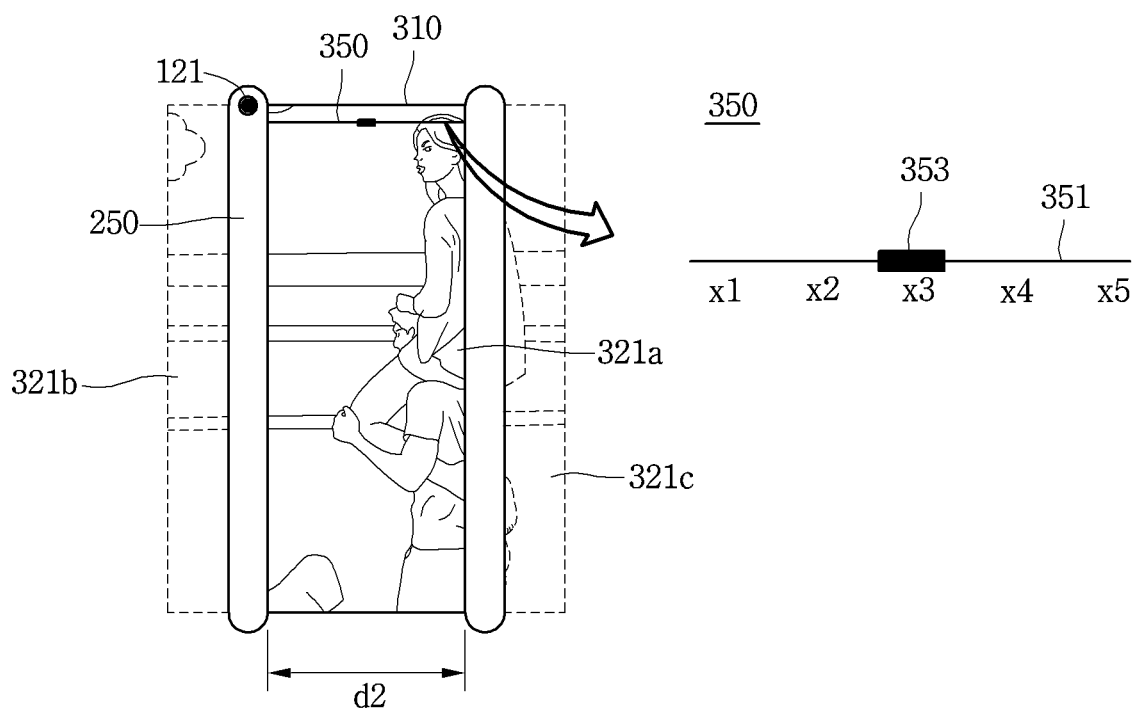
Figure 8C:
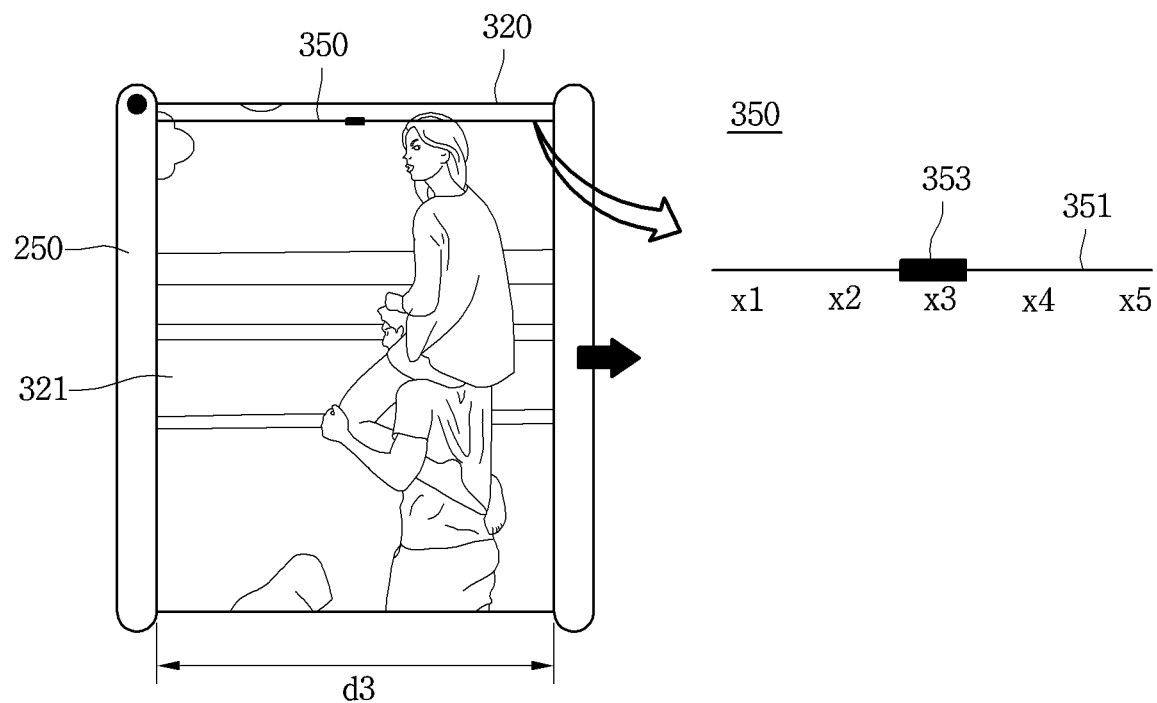

FIGS. 8A to 8C are views of enlarging and displaying content on a ratio indicator as a specific ratio numerical value is selected according to an embodiment of the present invention.

Referring to FIG. 8A, the screen of the display unit 250 is in a state of being expanded in the +x axis direction by the expansion area 310 corresponding to the expansion distance d2. The expansion distance d2 may be greater than the expansion distance d1 described with reference to FIGS. 6B and 6C and may be equal to or greater than a reference distance. The control unit 290 may perform a control on the display unit 250 to display an original size of content 311 in the expansion area 310. When the original size of content 311 is displayed, the control unit 290 may receive a request for moving the ratio box 353 to a position corresponding to the ratio numerical value X3. According to the received request, as shown in FIG. 8B, the control unit 290 may perform a control on the display unit 250 to display, in the expansion area 310 of the display unit 250, a partial image 321a of content obtained by enlarging the original content three times. The size of the expansion area 310 may be less than the size of the three-times enlarged content 321. In this case, only a partial area 321a of the three-times enlarged content 321 may be displayed in the expansion area 310 of the display unit 250 and the remaining images 321b and 321c may not be displayed. At this point, the control unit 290 may display a guide for further expanding the display unit 250 in order to allow a user to view the not-displayed remaining images.

When a force for expanding the display unit 250 in the +x axis direction is applied in FIG. 8B, the control unit 290 may perform a control on the display unit 250 to gradually display the not-displayed remaining images 321b and 321c while expanding the screen size of the display unit 250. That is, when the display unit 250 is expanded by the expansion area 320 corresponding to the expansion distance d3, the control unit 290, as shown in FIG. 8C, may perform a control to display the entire area of the three-times enlarged content 321 in the expansion area 320.

According to another embodiment of the present invention, the deformable display device 200 may guide to provide content with an optimized resolution on the basis of a display ratio of the content.

Figure 9A:
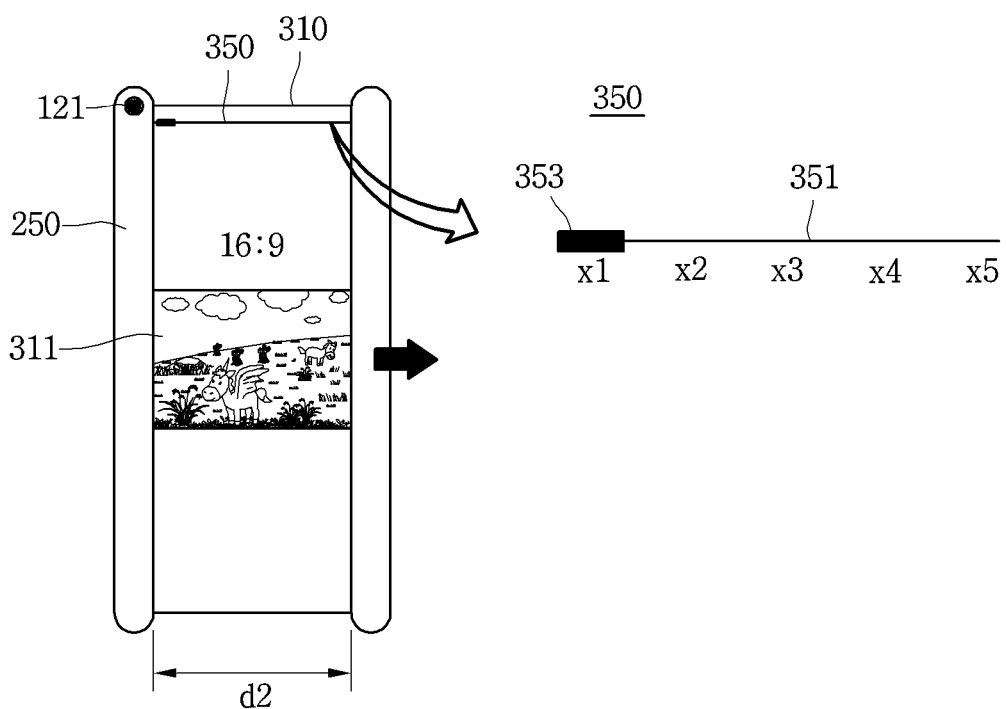
FIGS. 9A to 9C are views of guiding to provide content with an optimized resolution on the basis of a display ratio of the content according to an embodiment of the present invention.
Figure 9B:
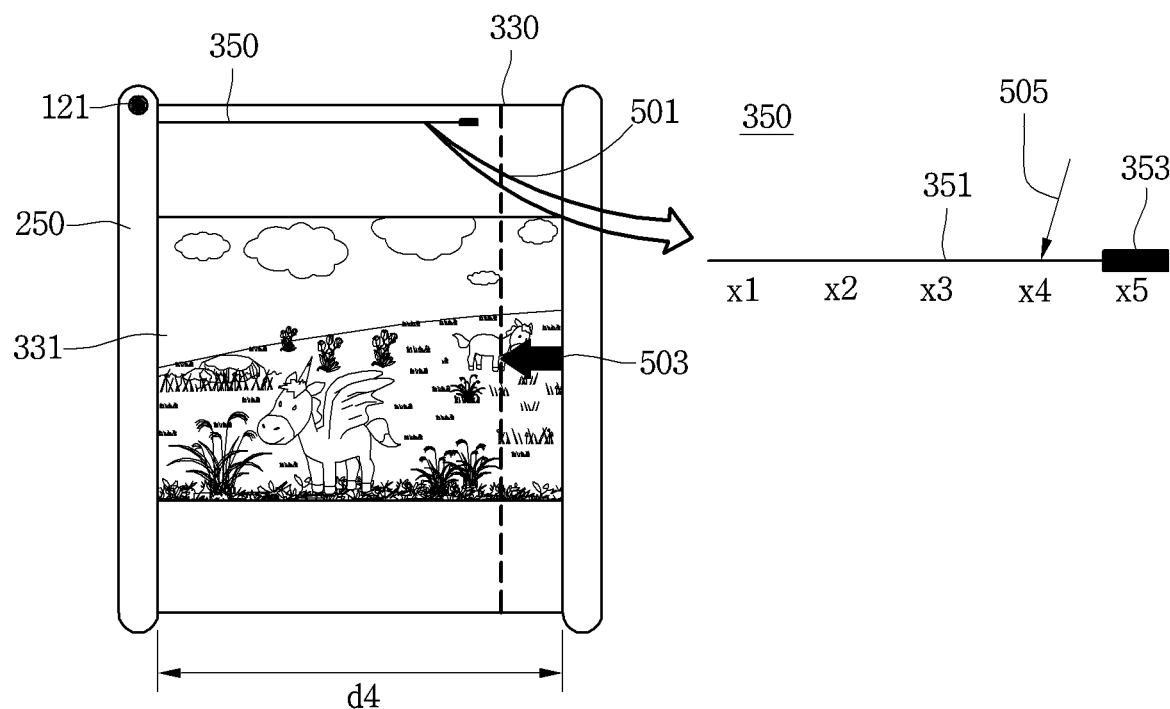
Figure 9C:
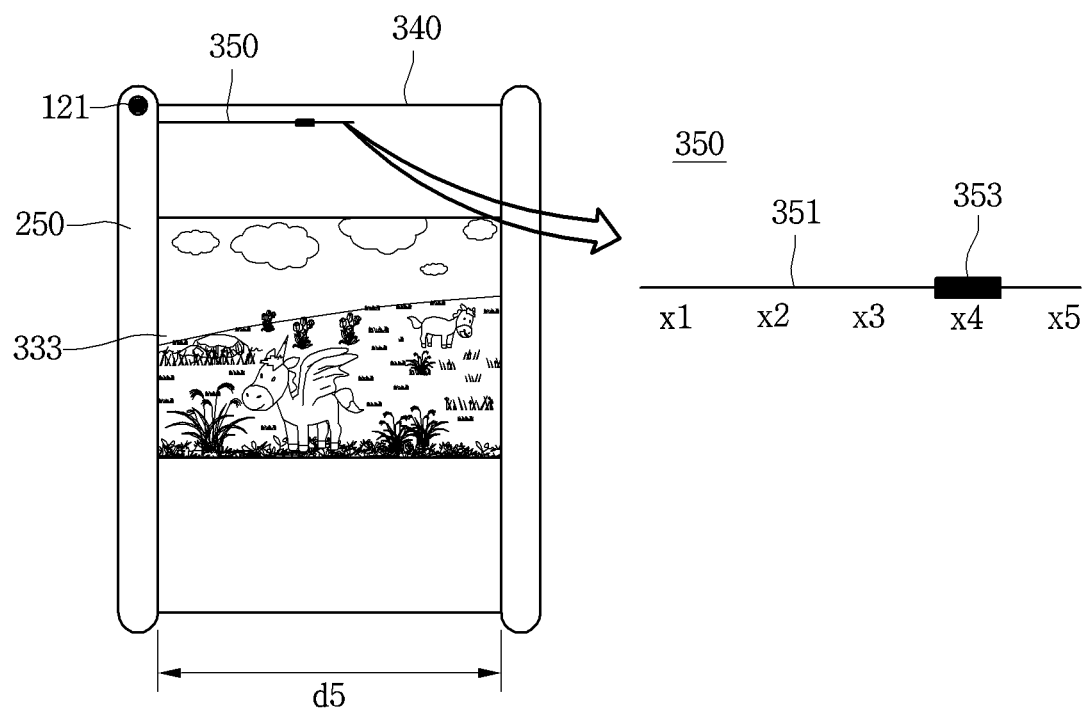

FIGS. 9A to 9C are views of guiding to provide content with an optimized resolution on the basis of a display ratio of the content according to an embodiment of the present invention.

Referring to FIG. 9A, the screen of the display unit 250 is in a state of being expanded in the +x axis direction by the expansion area 310 corresponding to the expansion distance d2. The expansion distance d2 may be greater than the expansion distance d1 described with reference to FIGS. 6B and 6C and may be equal to or greater than a reference distance. The control unit 290 may perform a control on the display unit 250 to display content 311 in the expansion area 310. Additionally, herein, it is assumed that a display ratio of the content 311 displayed in the expansion area 310 is 16:9. That is, it is assumed that a display ratio of the content 311 that the display unit 250 displays is 16:9. When the screen of the display unit 250 is expanded by an extension area 330 corresponding to an extension distance d4 according to a force applied in the +x axis direction in FIG. 9A, the control unit 290 may perform a control on the display unit 250 in order to enlarge an original size of content five times and display it. However, in this case, the content 331 that is enlarged with a display ratio of 16:9 and displayed may not have an optimal resolution. For example, it is assumed that four-times enlarged content has an optimal resolution. That is, an optimal enlargement ratio corresponding to a display ratio may be preset. The control unit 290 may perform a control on the display unit 250 to display at least one or more guide items 501, 503, and 505 for reducing the screen of the display unit 250 in order to allow content with 16:9 display ratio to have an optimal resolution. That is, the first guide item 501 may represent a guide line for guiding to reduce the screen of the display unit 250 by a specific point. The second guide item 503 may represent an indicator for reducing the screen of the display unit 250 to assist the first guide item 501. The first guide item 501 and the second guide item 503 may be displayed on an expansion area 330. That is, the third guide item 505 may represent an arrow for reducing the screen of the display unit 250 by a specific ratio numerical value (for example, X4). The third guide item 505 may be displayed on the enlargement/reduction guide bar 351. Herein, a line or an arrow is described exemplarily but this is just exemplary and this may be replaced with another form of an indicator.

When a force for reducing the screen of the display unit 250 in the −x axis direction is applied in FIG. 9B, the control unit 290, as shown in FIG. 9C, may reduce the screen of the display unit 250 by an expansion area 340 corresponding to an expansion distance d5. Accordingly, content 333 that is enlarged four times than an original size may be displayed in the expansion area 340.

That is, a user may view content with an optimized resolution by reducing the screen of the display unit 250 to a corresponding point through at least one or more guide items 501, 503, and 505.

According to another embodiment of the present invention, the deformable display device 200 may guide to provide content with an optimized resolution on the basis of a resolution that a corresponding device supports.

Figure 10A:
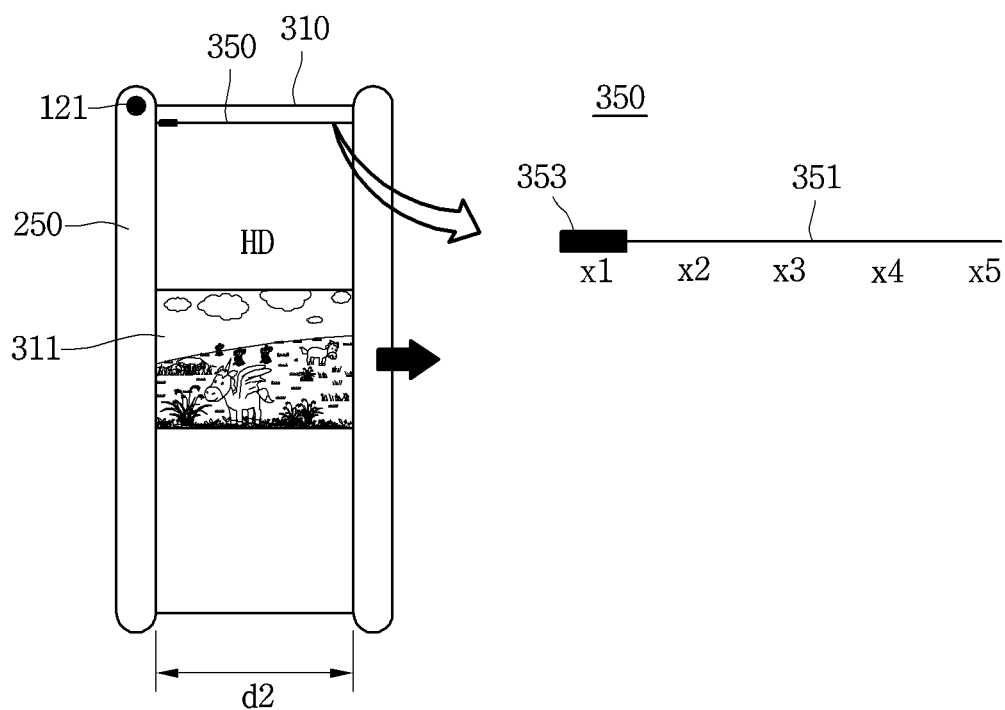
FIGS. 10A to 10C are views of guiding to provide content with an optimized resolution on the basis of a resolution that a deformable display device supports according to an embodiment of the present invention.
Figure 10B:
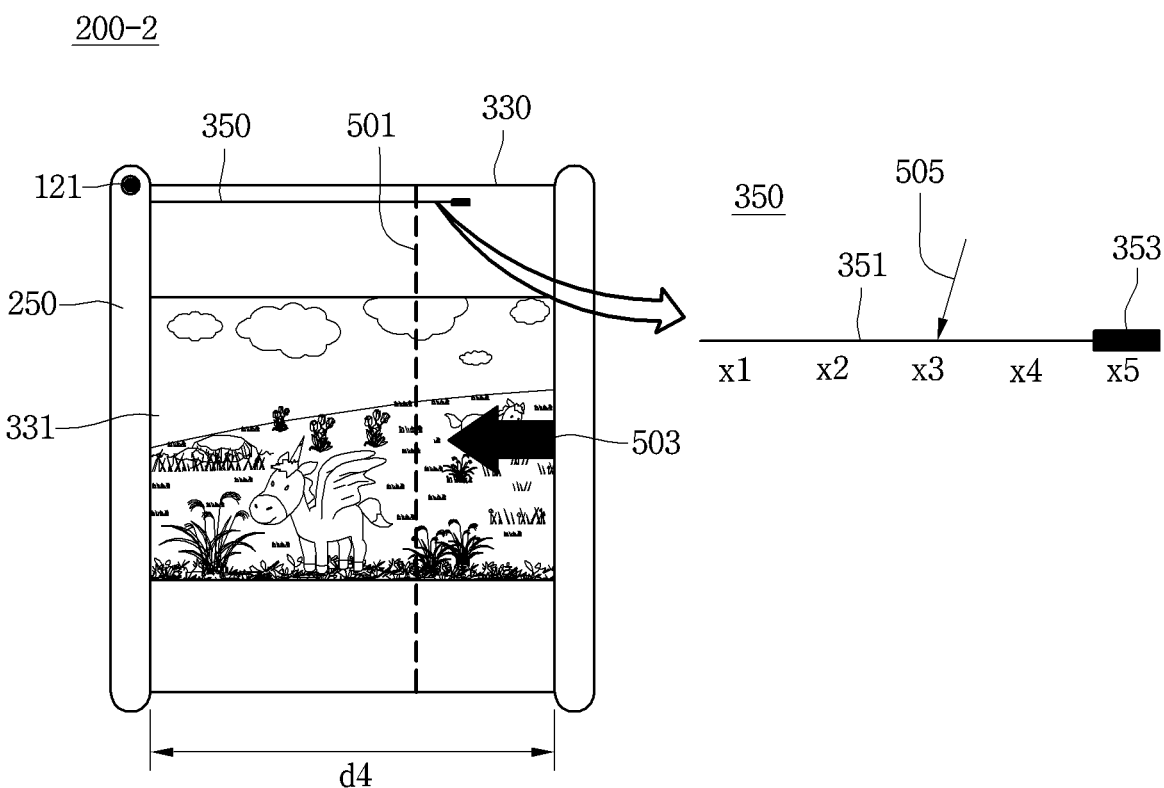
Figure 10C:
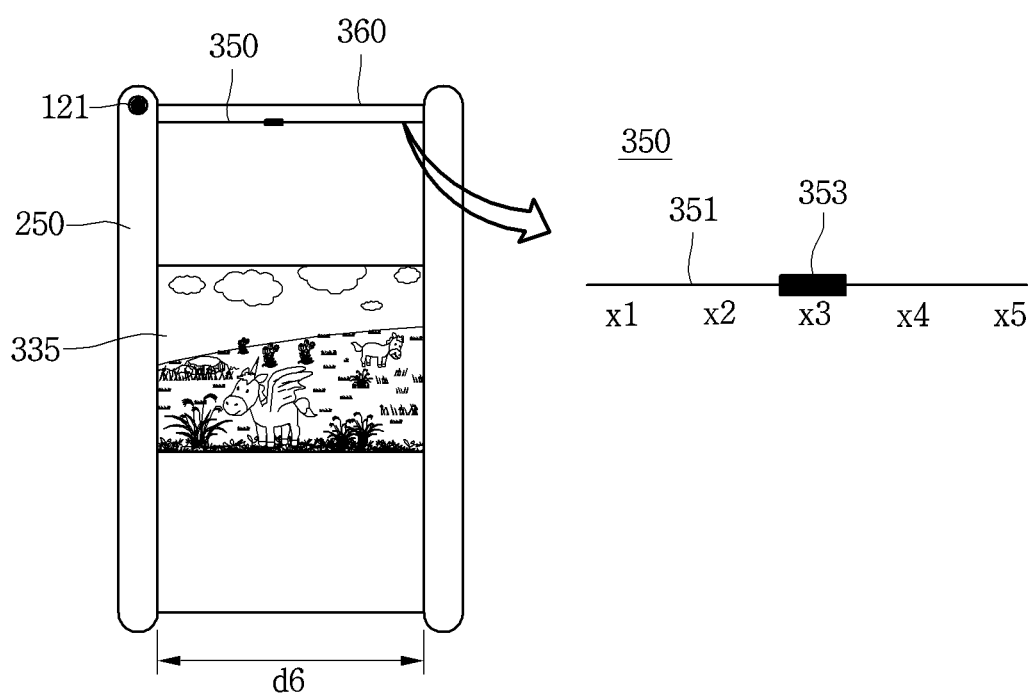

FIGS. 10A to 10C are views of guiding to provide content with an optimized resolution on the basis of a resolution that a deformable display device supports according to an embodiment of the present invention.

Referring to FIG. 10A, the screen of the display unit 250 is in a state of being expanded in the +x axis direction by the expansion area 310 corresponding to the expansion distance d2. The expansion distance d2 may be greater than the expansion distance d1 described with reference to FIGS. 6B and 6C and may be equal to or greater than a reference distance. The control unit 290 may perform a control on the display unit 250 to display content 311 in the expansion area 310. For example, a resolution that the display unit 250 supports is in high definition (HD) level. When the screen of the display unit 250 is expanded by an extension area 330 corresponding to an extension distance d4 according to a force applied in the +x axis direction in FIG. 10A, the control unit 290 may perform a control on the display unit 250 in order to enlarge an original size of content five times and display it. However, in this case, the content 331 that is enlarged five times than an original size may not have an optimal resolution. That is, when content is enlarged more than an optimized level, it may not be displayed with an HD quality. It is assumed that three-times enlarged content has an optimal resolution. That is, an optimal enlargement ratio corresponding to a resolution that the deformable display device 200 supports may be preset. The control unit 290 may perform a control on the display unit 250 to display at least one or more guide items 501, 503, and 505 for reducing the screen of the display unit 250 in order to allow the enlarged content 331 to have an optimal resolution. That is, the first guide item 501 may represent a guide line for guiding to reduce the screen of the display unit 250 by a specific point. The second guide item 503 may represent an indicator for reducing the screen of the display unit 250 to assist the first guide item 501. The first guide item 501 and the second guide item 503 may be displayed on an expansion area 330. The third guide item 505 may represent an arrow for reducing the screen of the display unit 250 by a specific ratio numerical value (for example, X3). The third guide item 505 may be displayed on the enlargement/reduction guide bar 351. Herein, a line or an arrow is described exemplarily but this is just exemplary and this may be replaced with another form of an indicator.

When a force for reducing the screen of the display unit 250 in the −x axis direction is applied in FIG. 10B, the control unit 290, as shown in FIG. 10C, may reduce the screen of the display unit 250 by an expansion area 360 corresponding to an expansion distance d6. Accordingly, content 335 that is enlarged three times than an original size may be displayed in the expansion area 360. A user may view content with an HD resolution by reducing the screen of the display unit 250 to a corresponding point through at least one or more guide items 501, 503, and 505.

Again, FIG. 5 is described.

Upon the receipt of a request for selecting one point of content displayed in the expansion area of the display unit 250 in operation 109, the control unit detects an additional force for expanding the display unit 205 in the first direction in operation S115. According to an embodiment of the present invention, a request for selecting one point of content may be a touch input for touching one point.

The control unit 290 enlarges and displays the content on the basis of a selected one point as expanding the display unit 250 according to the detected force in operation S117. That is, the control unit 290 may perform a control on the display unit 250 to display an enlarged content on the basis of the selected one point without entirely enlarging the content. This will be described below with reference to the drawing.

FIGS. 11A to 11D are views of enlarging and displaying content on the basis of one point of the displayed content as expanding the screen size of the display unit according to an embodiment of the present invention.

Figure 11A:
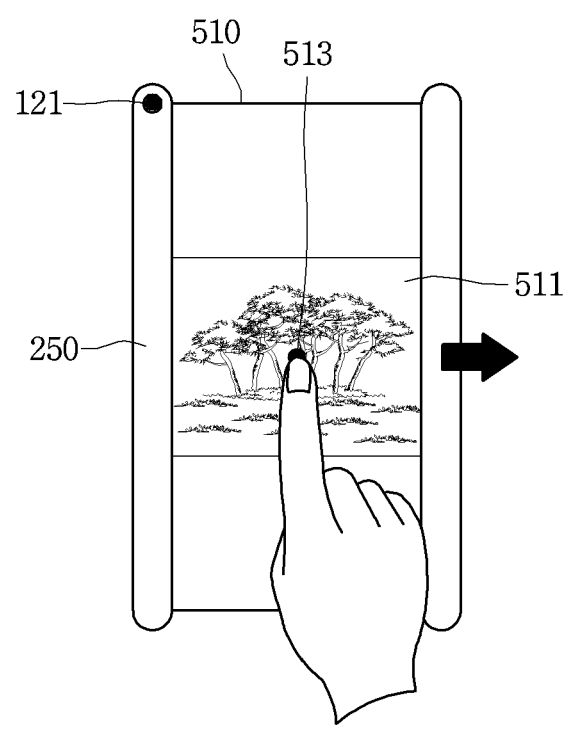
FIGS. 11A to 11D are views of enlarging and displaying content on the basis of one point of the displayed content as expanding the screen size of the display unit according to an embodiment of the present invention.
Figure 11B:
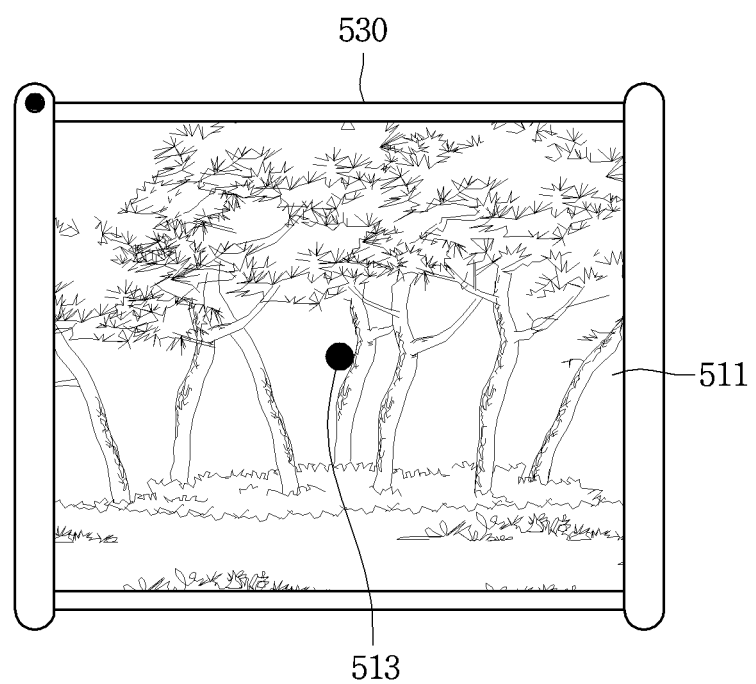

Referring to FIG. 11A, the screen of the display unit 250 is in a state of being expanded by the expansion area 510 and an image 511 is displayed in the expansion area 510. The control unit 290 may receive a request for selecting one point 513 of a display image 511. Then, by an additional force for expanding the display unit 250 in the +x axis direction, the screen of the display unit 250, as shown in FIG. 11B, may be expanded by the expansion area 530. The control unit 290 may perform a control on the display unit 250 to display an enlarged the image 511 on the basis of the selected one point 513 as expanding the screen size of the display unit 250.

As another example, while a request for selecting one point 513 of the image 511 is maintained, if force is applied to the display unit 250 in the +x axis direction, the control unit 290 may perform a control on the display unit 250 in order to display an enlarged image 511 on the basis of the selected on point 513 as expanding the screen size of the display unit 250 by the expansion area 530.

A user may select one point of the displayed content and applies a force for expanding the display unit 250, so that the user can easily view a desired part in more detail.

According to another embodiment of the present invention, according to a user input, one point of content may not be selected and content may be enlarged and displayed using an auto focus function. This will be described with reference to FIGS. 11C and 11D.

Figure 11C:
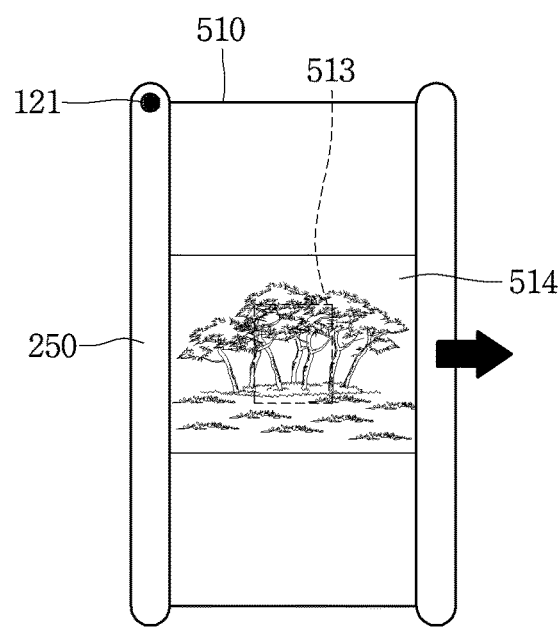
Figure 11D:
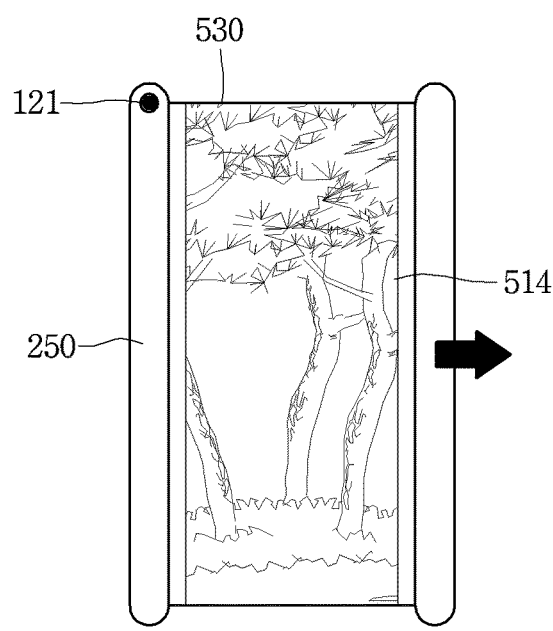

Referring to FIG. 11C, the screen of the display unit 250 may be in a state of being expanded by a preview area 510 and an image 511 of a subject obtained through the camera 121 may be displayed in the preview area 510. A focus guide 513 may be further displayed in the preview area 510. The focus guide 513 may be a guide for obtaining the proper image 511 of a subject by focusing one area of an image displayed on the preview area 510. When force is applied to the display unit 250 in the +x axis direction in FIG. 11C, the control unit 290, as shown in FIG. 11D, may expand the screen size of the display unit 250 as shown in FIG. 11D. The control unit 290 may perform a control on the display unit 250 to display an enlarged image 511 on the basis of the focus guide 513 as expanding the screen size of the display unit 250.

Figure 12A:
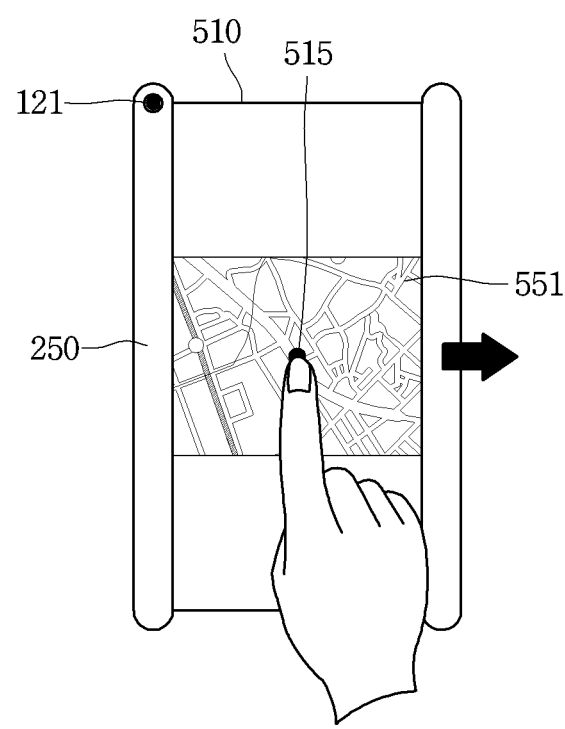
FIGS. 12A and 12B are views of enlarging and displaying content on the basis of one point of the displayed content as expanding the screen size of the display unit according to another embodiment of the present invention.
Figure 12B:
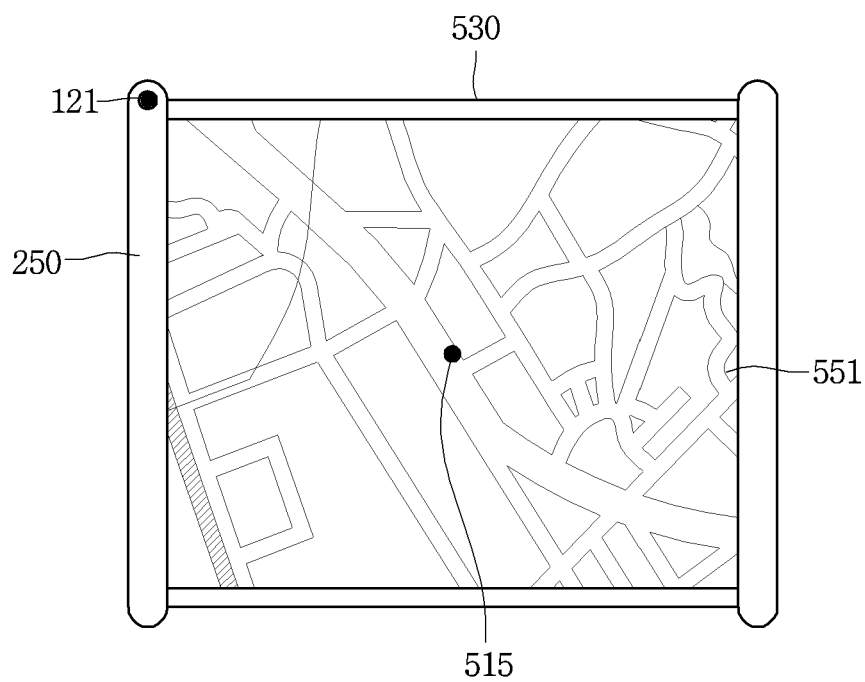

FIGS. 12A and 12B are views of enlarging and displaying content on the basis of one point of the displayed content as expanding the screen size of the display unit according to another embodiment of the present invention.

Referring to FIG. 12A, the screen of the display unit 250 is in a state of being expanded by the expansion area 510 and a map image 551 is displayed in the expansion area 510. The control unit 290 may receive a request for selecting one point 551 of the displayed map image 551. Then, by an additional force for expanding the display unit 250 in the +x axis direction, the screen of the display unit 250, as shown in FIG. 12B, may be expanded by the expansion area 530. The control unit 290 may perform a control on the display unit 250 to display an enlarged map image 515 on the basis of the selected one point 551 as expanding the screen size of the display unit 250.

A user may select one point of the displayed map image and applies a force for expanding the display unit 250, so that the user can easily view a desired position in more detail.

Again, FIG. 5 is described.

The control unit 290 detects a force for reducing the display unit 250 in the second direction opposite to the first direction in operation S119 and reduces and display content as reducing the display unit 250 according to the detected force in operation S121.

According to another embodiment of the present invention, as the screen size of the display unit 250 is expanded, if a partial image of content is cut out and not displayed, the deformable display device 200 may rotate the content to provide the cut-out partial image.

FIGS. 13A to 13D are views of providing a cut-out partial image by rotating content as the screen size of a display unit is expanded and a partial image of content is cut out and not displayed according to an embodiment of the present invention.

Especially, it is assumed in FIGS. 13A to 13D that a user views content on a vertical screen in which the vertical length of the display unit 250 is longer than the horizontal length.

Figure 13A:
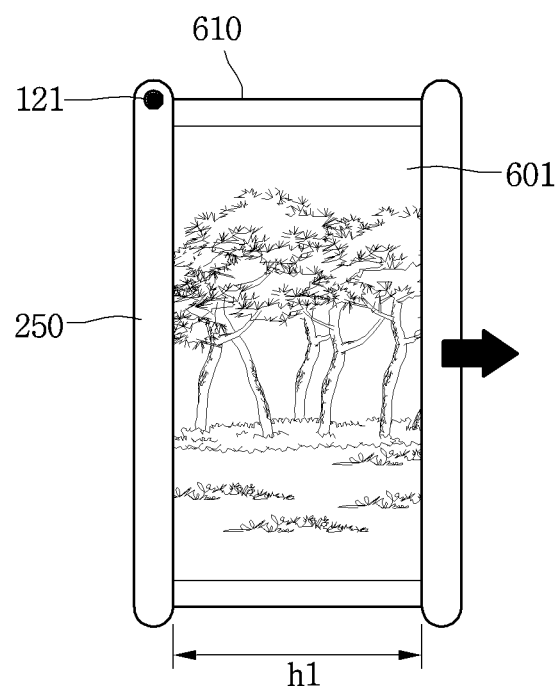
FIGS. 13A to 13D are views of providing a cut-out partial image by rotating content as the screen size of a display unit is expanded and a partial image of content is cut out and not displayed according to an embodiment of the present invention.
Figure 13B:
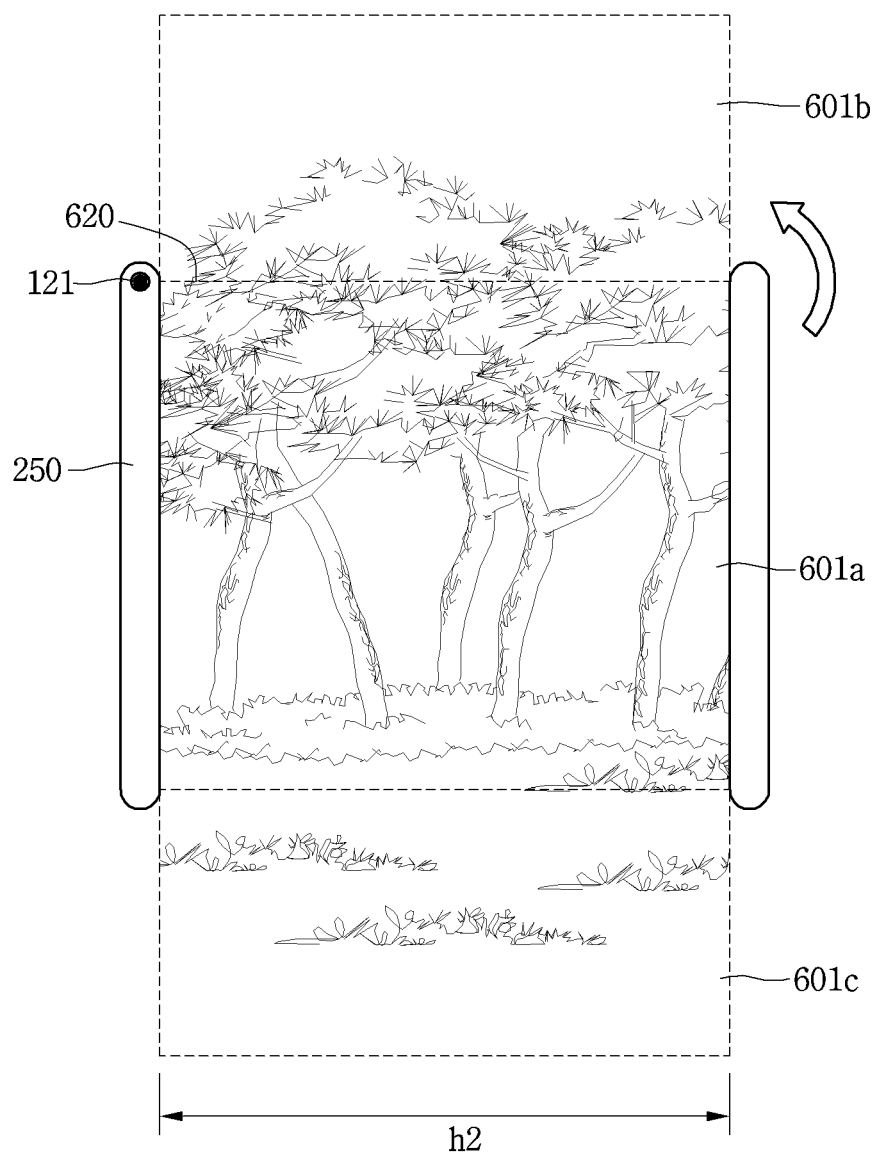
Figure 13C:
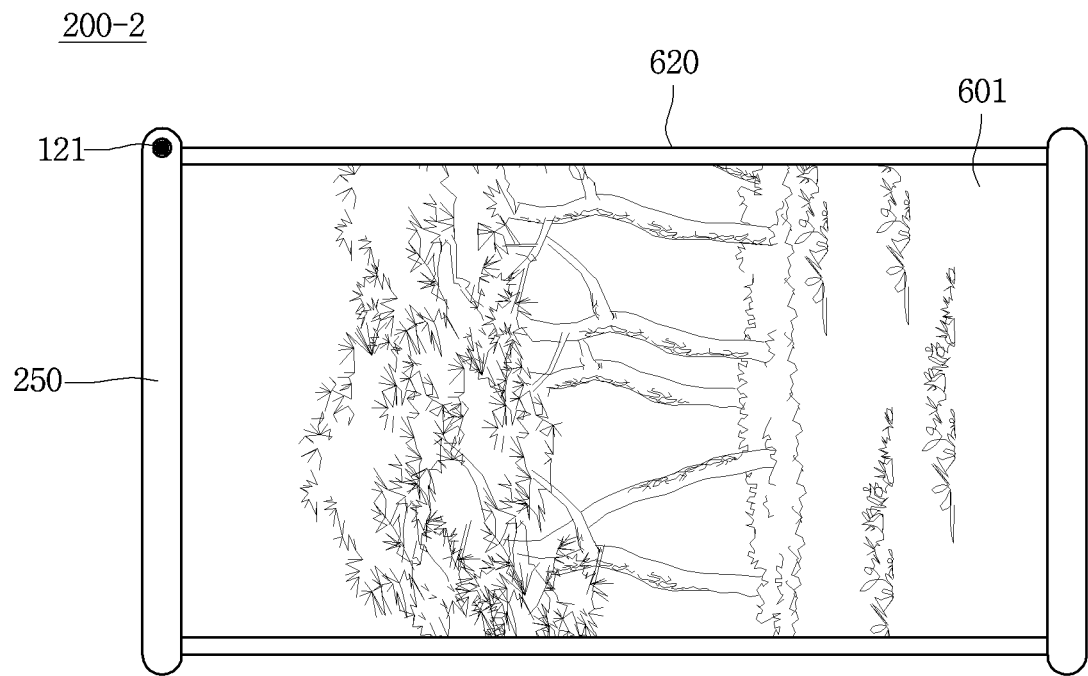
Figure 13D:
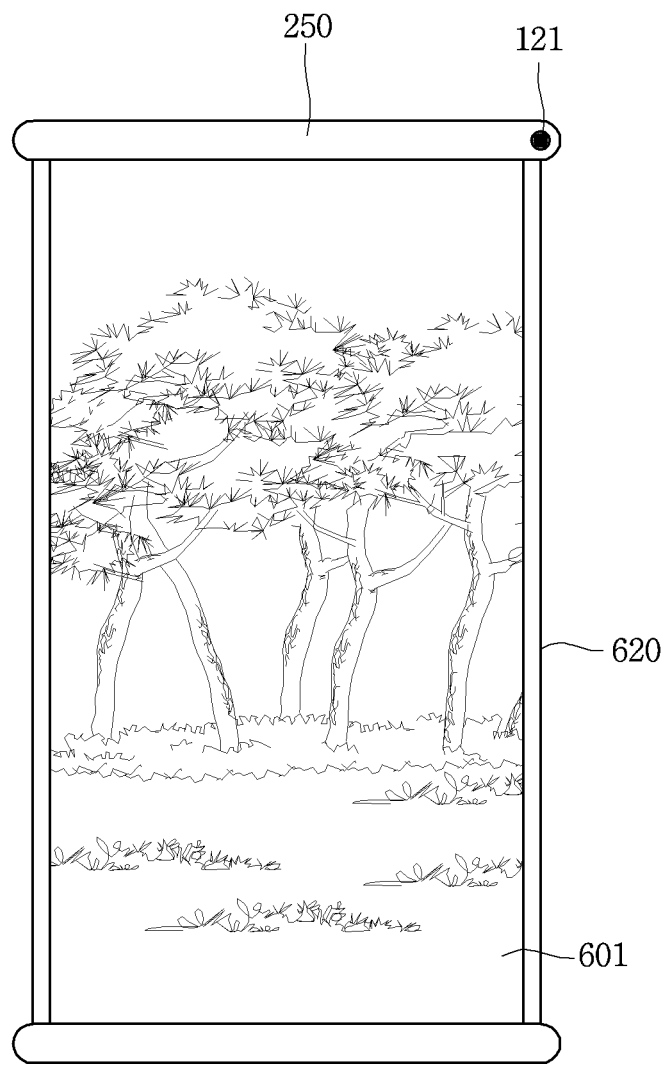

Referring to FIG. 13A, the screen size of the display unit 250 is in a state of being expanded by an expansion area 610 corresponding to an expansion distance h1 and content 601 is displayed in the expansion area 610. When a force applied to the display unit 250 in the +x axis direction is detected, the control unit 290 may expand the screen of the display unit 250 by an area 620 corresponding to an expansion distance h2. The control unit 290, as shown in FIG. 13B, may display content 601 to correspond to the size of the expanded area 620 as expanding the screen of the display unit 250. In this case, only a partial image 601a of the content 601 may be displayed in the expanded area 620 of the display unit 250 and the remaining images 601b and 601c of the content 601 may be cut out and not displayed. While enlarging and displaying the content 601 as expanding the screen size of the display unit 250, when the sizes of the remaining cut-out images 601b and 601c become half the size of an entire image of the content 601, as shown in FIG. 13C, the control unit 290 may rotate the content 601 in counterclockwise by 90° automatically and display it. That is, the control unit 290 may rotate and display the content 601 as a user rotates the display unit 250. Referring to FIG. 13D, a user may view the entire image of the content 601 in a vertical screen by rotating the display unit 250 in clockwise by 90°.

FIGS. 14A to 14D are views of providing a cut-out partial image by rotating content as the screen size of a display unit is expanded and a partial image of content is cut out and not displayed according to another embodiment of the present invention.

Especially, it is assumed in FIGS. 14A to 14D that a user views content on a horizontal screen in which the horizontal length of the display unit 250 is longer than the vertical length.

Figure 14A:
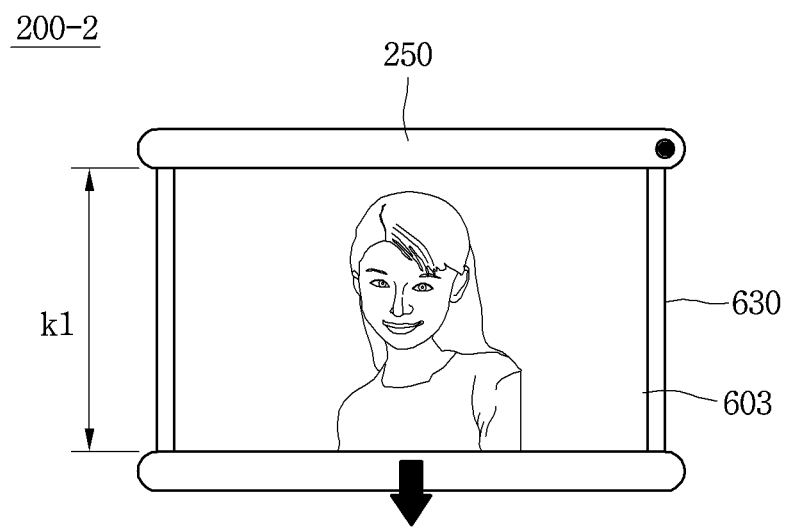
FIGS. 14A to 14D are views of providing a cut-out partial image by rotating content as the screen size of a display unit is expanded and a partial image of content is cut out and not displayed according to another embodiment of the present invention.
Figure 14B:
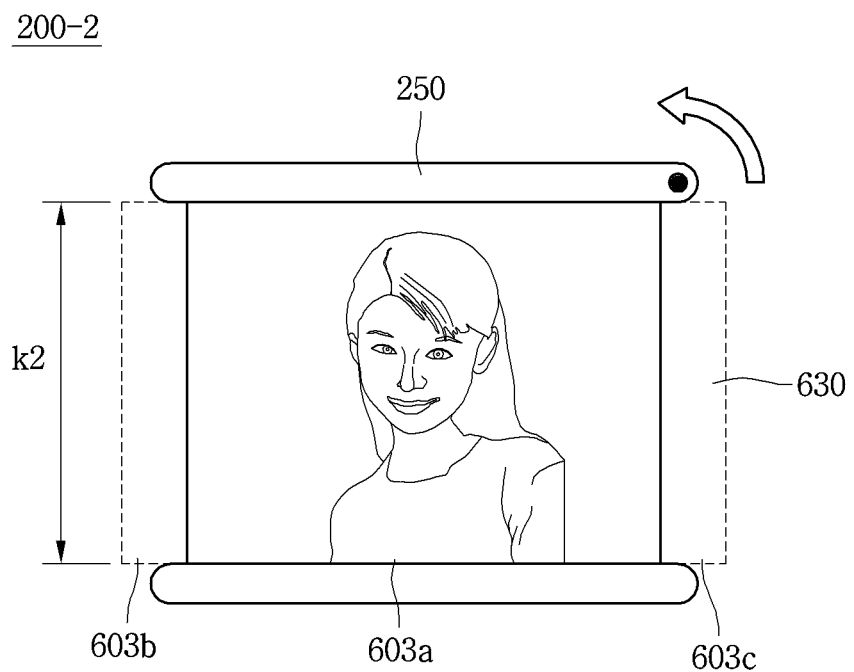
Figure 14C:
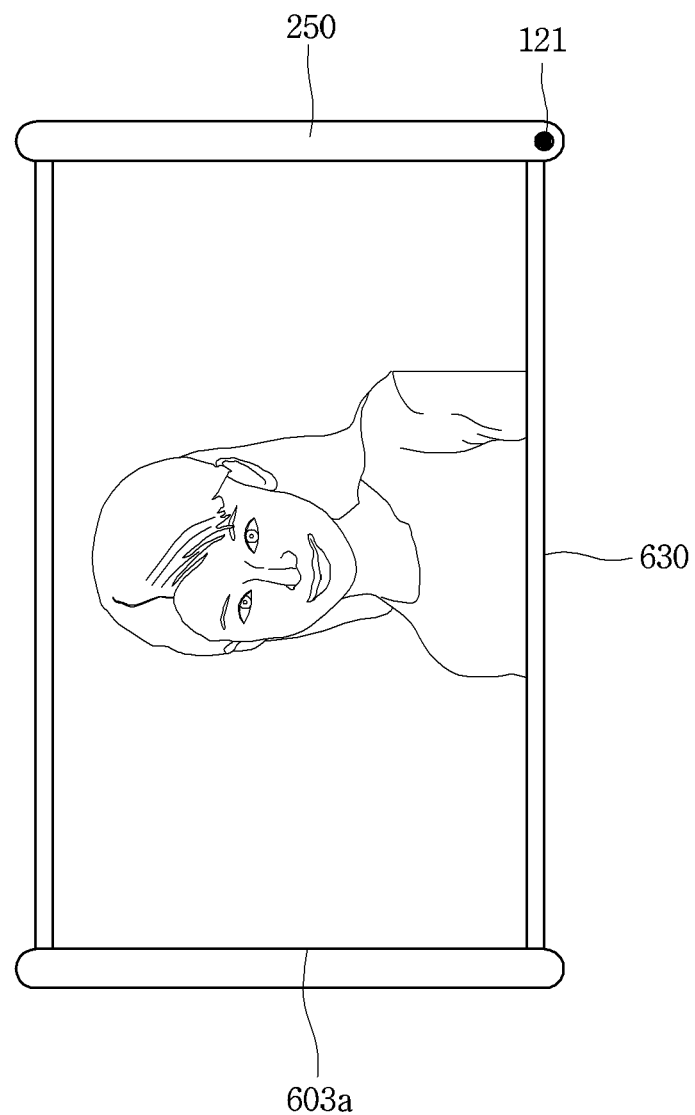
Figure 14D:
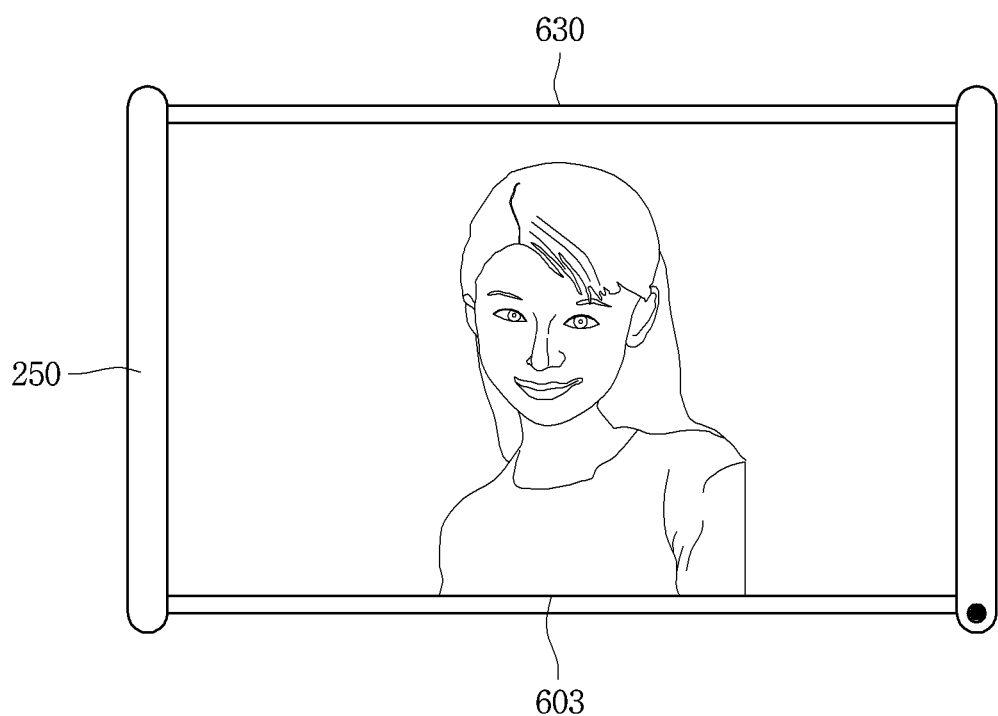

Referring to FIG. 14A, the screen size of the display unit 250 is in a state of being expanded by an expansion area 630 corresponding to an expansion distance k1 and content 603 is displayed in the expansion area 630. When a force applied to the display unit 250 in the −y axis direction is detected, the control unit 290 may expand the screen of the display unit 250 by an area 630 corresponding to an expansion distance k2. The control unit 290, as shown in FIG. 14B, may display content 603 to correspond to the size of the expanded area 630 as expanding the screen of the display unit 250. In this case, only a partial image 603a of the enlarged content 603 may be displayed in the expanded area 630 of the display unit 250 and the remaining images 603b and 603c of the enlarged content 603 may be cut out and not be displayed in the area 630. While enlarging and displaying the content 603 as expanding the screen size of the display unit 250, when the sizes of the remaining cut-out images 603b and 603c become half the size of an entire image of the content 603, as shown in FIG. 14C, the control unit 290 may rotate the content 603 in counterclockwise by 90° automatically and display it. That is, the control unit 290 may rotate and display the content 601 as a user rotates the display unit 250. Referring to FIG. 14D, a user may view the entire image of the content 601 in a vertical screen by rotating the display unit 250 in clockwise by 90°.

According to another embodiment of the present invention, while the screen size of the display unit 250 is in a state of being expanded to the maximum, a film view including a plurality of reduced images may be provided by an operation of folding and unfolding the end of a screen.

FIGS. 15A to 15E illustrate views of providing a film view including a plurality of reduced images by an operation of folding or unfolding the end of a screen while the screen size of a display unit is in a state of being expanded to the maximum.

Figure 15A:
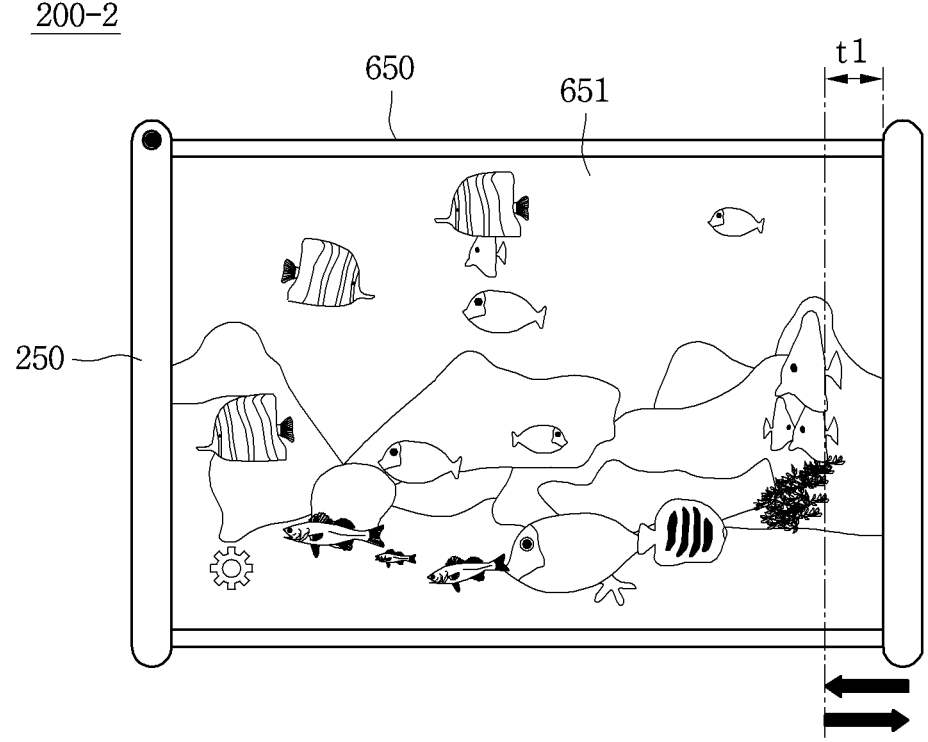
FIGS. 15A to 15E illustrate views of providing a film view including a plurality of reduced images by an operation of folding or unfolding the end of a screen while the screen size of a display unit is in a state of being expanded to the maximum.
Figure 15B:
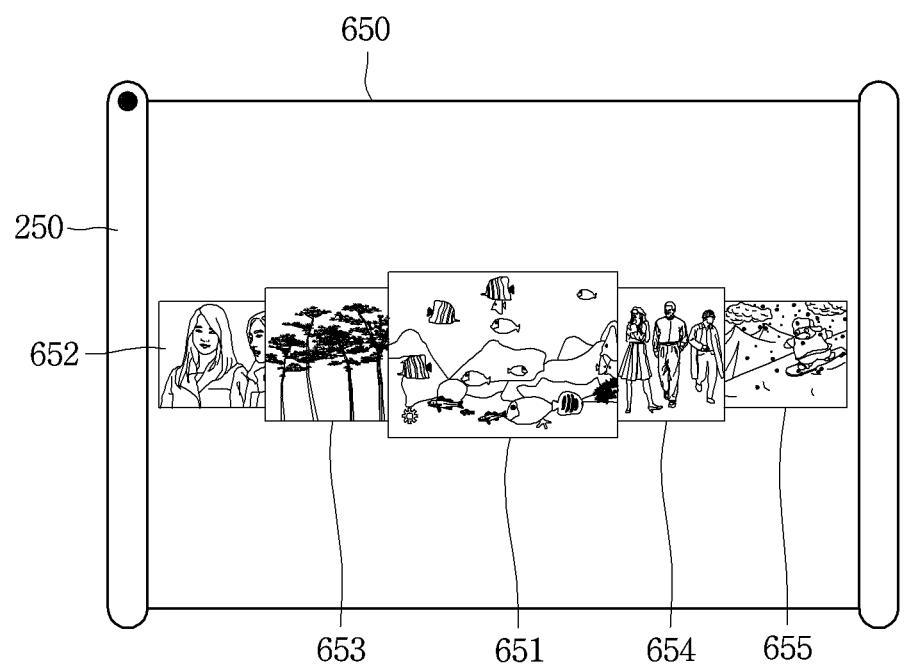

FIGS. 15A to 15E may be in a state that a gallery application for providing captured pictures is in execution. Referring to FIG. 15A, the screen of the display unit 250 may be in a state of being expanded into the maximum size. The first image 651 may be enlarged and displayed in the area 650 where the screen of the display unit 250 is expanded to the maximum. During this state, if a force for reducing the display unit 250 by a predetermined distance t1 and expanding it again is detected, the control unit 290, as shown in FIG. 15B, may perform a control on the display unit 250 in order to reduce a plurality of images 651 to 655 stored in the storage unit 270 and display them like a film view. The size of the first image 651 may be greater than the sizes of the other images 652 to 655 and the sizes of the second image 653 and the third image 654 may be greater than the sizes of the fourth image 652 and the fifth image 655.

Figure 15C:
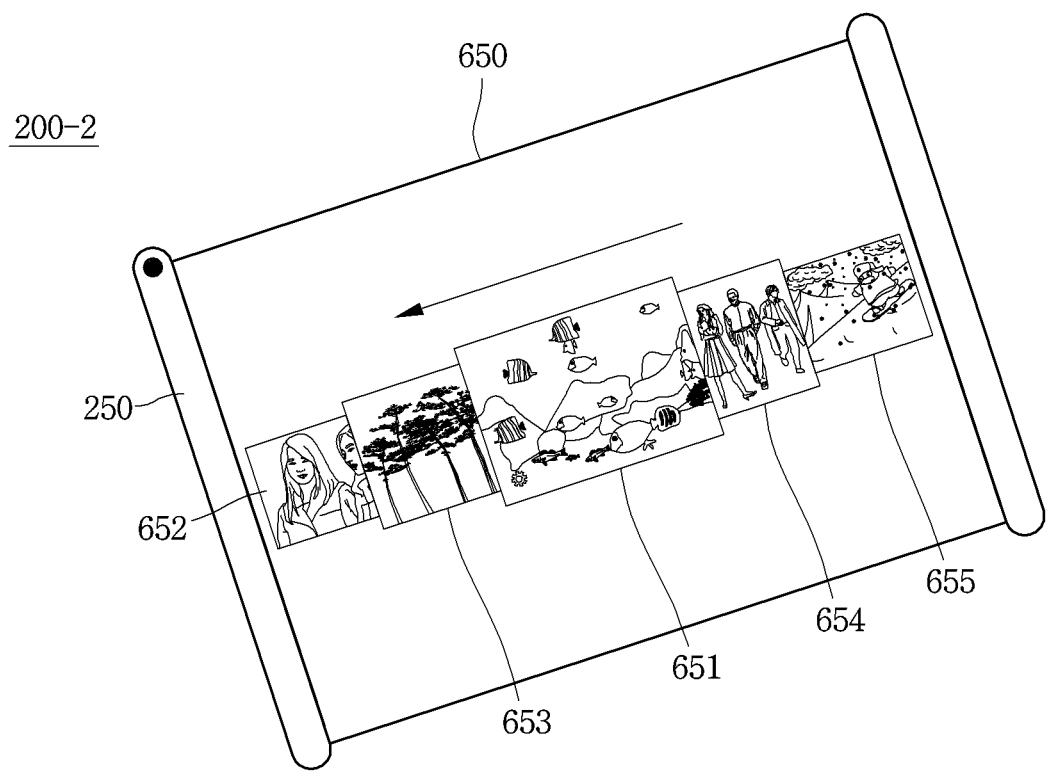
Figure 15D:
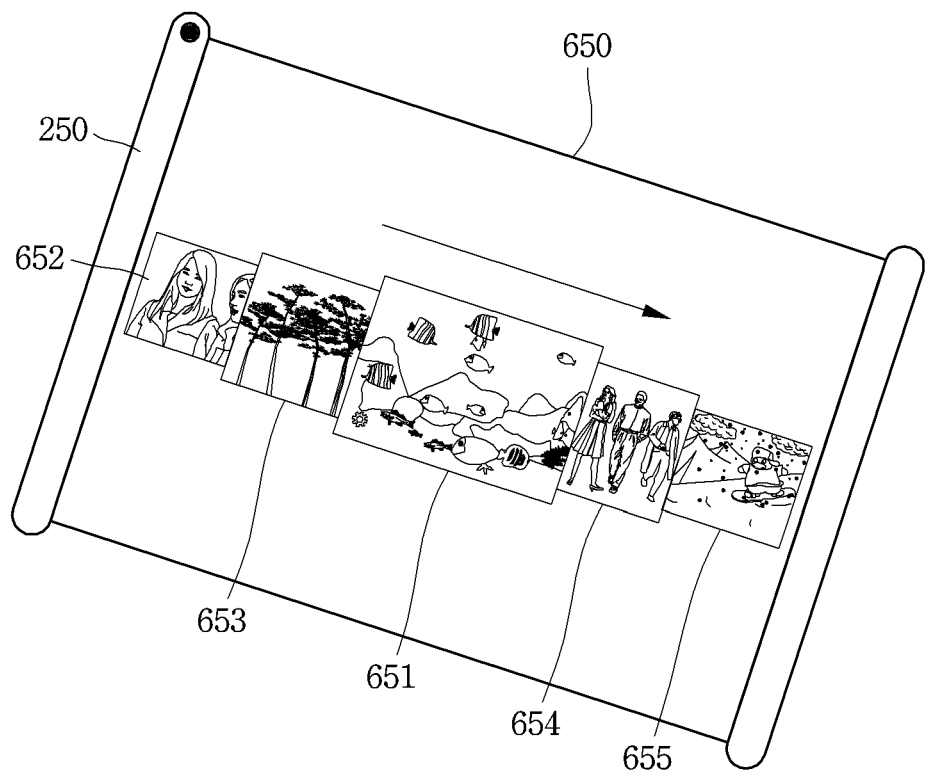
Figure 15E:
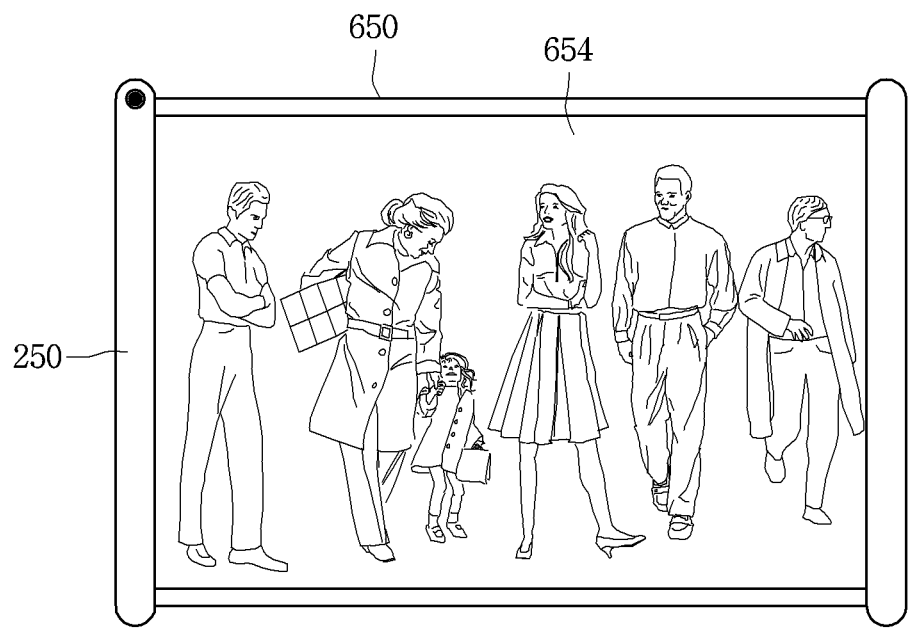

Moreover, as shown in FIGS. 15C and 15D, while the plurality of image 651 to 655 are displayed, if the displaying unit 250 is tilted to the left or right, the control unit 290 may perform a control on the display unit 250 to allow the plurality of images 651 to 655 to be scrolled in a corresponding direction. After a scroll operation, after the display unit 250 is returned to a state of not being tilted, if a predetermined time elapses, the control unit 290 may display an enlarged third image 654 disposed at the center among the plurality of images 651 to 655, in the area 650 where the display unit 250 is expanded to the maximum.

According to various embodiments of the present invention, a user may view enlarged or reduced content easily with a simple operation of expanding and reducing the screen size of a display unit.

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

What is claimed is:

1. A flexible display device comprising:
a display expandable or reducible;
a sensor configured to detect an expansion or reduction of a screen of the display; and
a controller configured to:
expand the screen of the display to an expanded screen based on the expansion of the screen, and
display a content and a ratio indicator on the expanded screen,
wherein the ratio indicator comprises:
information on an enlargement ratio of the displayed content or a reduction ratio of the displayed content, and
an enlargement/reduction guide bar representing a degree of a ratio that the displayed content can be further enlarged or reduced.

2. The device according to claim 1, wherein the ratio indicator further comprises:
a ratio box disposed on the enlargement/reduction guide bar and representing a current expansion or current reduction ratio of the displayed content; and
a plurality of ratio numerical values representing the enlargement or reduction ratio as a numerical value.

3. The device according to claim 1, wherein the controller is further configured to display a guide for enlarging or reducing the screen of the display to display the content having a size of an optimal resolution corresponding to a display ratio of the content.

4. The device according to claim 1, wherein the controller is further configured to display a guide for enlarging or reducing the screen of the display to display the content having a size of an optimal resolution corresponding to a resolution that the flexible display device supports.

5. The device according to claim 1, wherein the controller is further configured to receive a request selecting one point of the content and display an enlarged content based on the one point selected according to the request.

6. The device according to claim 1, wherein the controller is further configured to display the content in an area of the expanded screen when an expanded distance of the expanded screen is greater than a reference distance.

7. The device according to claim 1, wherein the controller is further configured to display a guide in an area of the expanded screen when an expanded distance of the screen is less than a reference distance, the guide inducing a user to further expand the expanded screen.

8. The device according to claim 1, wherein the flexible display device is one of a stretchable display device or a rollable display device.

9. A method of controlling a flexible display device including a display, the method comprising:
detecting an expansion of a screen of the display;
expanding the screen to an expanded screen based on the detecting the expansion;
displaying a content and a ratio indicator on the expanded screen of the display,
wherein the ratio indicator comprises:
information on an enlargement ratio of the displayed content or a reduction ratio of the displayed content, and
an enlargement/reduction guide bar representing a degree of a ratio that the displayed content can be further enlarged or reduced.

10. The method according to claim 9, wherein the ratio indicator further comprises:
a ratio box disposed on the enlargement/reduction guide bar and representing a current expansion or current reduction ratio of the displayed content; and
a plurality of ratio numerical values representing the enlargement or reduction ratio as a numerical value.

11. The method according to claim 10, further comprising:
displaying a guide for enlarging or reducing the screen of the display to display the content having a size of an optimal resolution corresponding to a display ratio of the content.

12. The method according to claim 10, further comprising:
receiving a request selecting one point of the content; and
enlarging and displaying the content based on the one point selected according to the request.

13. The method according to claim 10, wherein the displaying the content in the expanded screen comprises, when an expanded distance of the expanded screen is greater than a reference distance, displaying the content in an area of the expanded screen.

14. The method according to claim 10, further comprising:
when an expanded distance of the expanded screen is less than a reference distance, displaying a guide on the expanded screen, the guide inducing a user to further expand the expanded screen.

* * * * *